US00RE40483E

(19) United States
(12) Reissued Patent
Morita et al.

(10) Patent Number: US RE40,483 E
(45) Date of Reissued Patent: Sep. 9, 2008

(54) HEADGEAR HOLDER FOR USE WITH SEWING MACHINE

(75) Inventors: Tetsuo Morita, Nagoya (JP); Satoshi Kato, Kariya (JP)

(73) Assignee: Brother Kogyo Kabushiki Kaisha, Nagoya (JP)

(21) Appl. No.: 09/416,985
(22) Filed: Oct. 12, 1999

Related U.S. Patent Documents

Reissue of:
(64) Patent No.: 5,701,831
Issued: Dec. 30, 1997
Appl. No.: 08/668,471
Filed: Jun. 25, 1996

U.S. Applications:
(63) Continuation-in-part of application No. 08/605,794, filed on Feb. 22, 1996, now Pat. No. 5,649,496.

(30) Foreign Application Priority Data

Feb. 27, 1995 (JP) ..... 7-064772
Jun. 29, 1995 (JP) ..... 7-163605
Aug. 28, 1995 (JP) ..... 7-218454

(51) Int. Cl.
*D05B 39/00* (2006.01)
*D05C 9/04* (2006.01)
*D05B 27/00* (2006.01)

(52) U.S. Cl. ..... 112/103

(58) Field of Classification Search ..... 112/103, 112/470.06, 470.14, 102.5, 475.11, 475.18, 112/12; 38/102.91, 102.2
See application file for complete search history.

(56) References Cited

U.S. PATENT DOCUMENTS 4,598,488 A 7/1986 Inteso
4,665,844 A 5/1987 Shibata
4,665,884 A 5/1987 Shibata ..... 112/103
4,774,778 A 10/1988 Williams
4,998,964 A * 3/1991 Golia ..... 112/102.5
5,167,194 A 12/1992 Nakagaki
5,261,338 A 11/1993 Tajima et al. ..... 112/103
5,277,140 A 1/1994 Nakagaki
5,415,116 A 5/1995 Nishio
5,553,560 A 9/1996 Tajima et al. ..... 112/103
5,598,797 A 2/1997 Patterson ..... 112/103

FOREIGN PATENT DOCUMENTS

JP 6-257057 9/1994
JP 6-313257 11/1994

* cited by examiner

*Primary Examiner*—Ismael Izaguirre
(74) *Attorney, Agent, or Firm*—Oliff & Berridge, PLC

(57) ABSTRACT

A headgear holder for use with a sewing machine, the holder holding a headgear including a covering member with an opening and a sweatband fixed to an annular portion of the covering member located on the side of the opening, [the sweatband being foldable into an inner space of the covering member and unfoldable outside from the inner space through the opening, the sewing machine forming an embroidery on each of a frontal portion, and at least one of a right and a left temporal portion, of the annular portion,] the holder including a main frame member on which the headgear is set such that the sweatband unfolded outside and the annular portion of the covering member externally fit on the main frame member, a pressing member which externally presses the headgear set on the main frame member, and two fastening devices [one of] which [is provided between the main frame member and a corresponding one of opposite ends of the pressing member and the other of which is provided between the main frame member and the other end of the pressing member, the two fastening devices cooperating] *cooperate* with each other to fasten the pressing member to the main frame member to hold the headgear between the pressing member and the main frame member, each of the fastening devices being provided at a position where the each fastening device permits the sweatband unfolded outside to fit externally on the main frame member.

33 Claims, 19 Drawing Sheets

HEADGEAR HOLDER FOR USE WITH SEWING MACHINE

Matter enclosed in heavy brackets [ ] appears in the original patent but forms no part of this reissue specification; matter printed in italics indicates the additions made by reissue.

This is a continuation-in-part application from U.S. patent application Ser. No. 08/605,794 filed Feb. 22, 1996 now U.S. Pat. No. 5,649,496.

BACKGROUND OF THE INVENTION

1. Field of the Invention

The present invention relates to a headgear holder which holds a headgear, such as a baseball cap, so that a sewing machine forms stitches on the headgear held by the headgear holder.

2. Related Art Statement

There is known a multiple-needle embroidering machine which forms embroidery stitches with a plurality of color-different embroidery threads. One or more work sheets, such as cloth or leather, are held by an embroidery frame attached to a movable frame. While the movable frame is moved in an X direction and a Y direction (parallel to a sewing arm of the machine), independently of each other, the embroidering machine forms an embroidery on the work sheet or sheets.

There is also known a headgear holding device which holds a headgear. While the headgear holding device is moved by an X-direction feeding device and a Y-direction feeding device of an embroidering machine to each of which the holding device is operatively connected, the embroidering machine forms an embroidery on a frontal portion of the headgear.

The above headgear holding device includes a headgear-holder moving device and a headgear holder which holds a headgear and which is detachably attached to the moving device while holding the headgear. The moving device includes a base structure which is movable in a Y direction, and a rotatable structure which is supported by the base structure such that the rotatable structure is rotatable relative to the base structure about an axis line parallel to the Y direction. However, the base structure may be omitted. In the latter case, the rotatable structure and the headgear holder may be supported by a base member of an embroidering machine via a guide bar such that the rotatable structure and the headgear holder are movable on the guide bar relative to the base member in the Y direction.

For example, Japanese Patent Application laid open for inspection purposes under Publication No. 6(1994)-257057 discloses a cap holder which includes a main frame member and a pressing frame member. The main frame member includes a curved attachment portion which is adapted to be attached to a rotatable structure as a part of a cap-holder moving device, and a cap support portion which is adapted to support a cap which is held by the cap holder. The pressing frame member is externally and detachably fastened to the main frame member, with the cap being held between the two frame members.

In the above-indicated cap holder, the main and pressing frame members cooperate with each other to hold the outer periphery (i.e., four sides) of a rectangular embroidery area defined in a frontal portion of a cap. This cap holder can be used for holding caps in various sizes (in particular, with various depths), by adjusting the position of one of four holding portions of the pressing and main frame members which presses one of the four sides of the embroidery area which extends parallel to the visor of the cap and is more remote from the visor than the opposite holding portion extending parallel to the visor.

However, the conventional headgear holders each hold only a frontal portion or its peripheral portions of a headgear so that an embroidery may be formed in an embroidery area which is defined in the frontal portion and has a predetermined shape.

There are known various headgear holders having various shapes. However, since a headgear holder holds a headgear so that an embroidery may be formed in a frontal portion of the headgear, the holder includes a main frame member on which an annular portion of the headgear which defines an opening thereof externally fits, and a sweatband or a sweat absorbing member of the headgear which is unfolded and kept outside externally fits. The holder additionally includes a pressing frame member which cooperates with the main frame member to sandwich four sides of an embroidery area of the headgear. One of opposite ends of the pressing frame member is connected via a hinging device to the main frame member such that the former is rotatable relative to the latter, and the other end of the pressing frame member is fastened via a fastening device to the main frame member such that the former is unfastenable from the latter.

In order to form an excellent embroidery on an embroidery area of a headgear, it is needed to have the headgear held by the headgear holder such that the embroidery area of the headgear is sufficiently stretched on the main frame member. With the pressing frame member being unfastened from the main frame member, i.e., with the pressing frame member being rotated and kept away from the main frame member, the headgear externally fits on the main frame member, the pressing frame member externally fits on the main frame member with the headgear being sandwiched between the two frame members, and the fastening device is operated to fasten the pressing frame member to the main frame member.

In the above-indicated prior headgear holder, the pressing frame member has a small dimension in a circumferential direction of the main frame member, since an embroidery is formed on only a frontal portion of a headgear. Accordingly, an operator operates the fastening device while one end portion of the frontal portion of the headgear is held at one side of the pressing frame member and the opposite end portion of the frontal portion is stretched by one hand of his or hers.

Recently, there is a demand to form an embroidery on a right and/or a left temporal portion of a headgear. To this end, a headgear holder is needed which holds a headgear such that an embroidery area of each of a frontal portion and a temporal portion of the headgear is sufficiently stretched and such that a portion of a sweatband or a sweat absorbing member which corresponds to the temporal portion of the headgear is unfolded and kept outside.

SUMMARY OF THE INVENTION

It is therefore an object of the present invention to provide a headgear holder which holds a headgear in such a manner which permits an embroidery to be formed on a temporal portion of the headgear held thereby.

The above object has been achieved by the present invention. According to a first aspect of the present invention, there is provided a headgear holder for use with a sewing machine, the headgear holder holding a headgear including a covering member which has an opening and covers the head of a person through the opening, and a sweatband which is fixed at a portion thereof to an inner surface of an annular portion of the covering member located on the side of the opening, the sweatband being foldable into an inner space of the covering member and unfoldable outside from the inner space through the opening, the sewing machine forming an embroidery on each of a frontal portion, and at least one of a right and a left temporal portion, of the annular portion, the headgear holder comprising a main frame member on which the headgear is set such that the sweatband unfolded outside and the annular portion of the covering member externally fit on the main frame member, a pressing member which externally presses the headgear set on the main frame member, and two fastening devices one of which is provided between the main frame member and a corresponding one of opposite ends of the pressing member and the other of which is provided between the main frame member and the other end of the pressing member, the two fastening devices cooperating with each other to fasten the pressing member to the main frame member to hold the headgear between the pressing member and the main frame member, each of the fastening devices being provided at a position where the each fastening device permits the sweatband unfolded outside to fit externally on the main frame member. The sweatband may be a leather member which protects the covering member from sweat perspired from the head of a wearer, or a cloth member which absorbs the sweat. The headgear may be a hat, or a cap with a visor.

The headgear holder in accordance with the first aspect of the present invention enjoys the advantage that when an operator fits the sweatband unfolded outside and the annular portion of the covering member externally on the main frame member, his or her job is not interfered with by the fastening devices. Since the headgear is set on the main frame member such that the sweatband is unfolded and kept outside, the sewing machine can easily form an embroidery on each of a frontal portion and a right and/or left temporal portion of the headgear. In addition, since the present headgear holder includes the two fastening devices corresponding to the opposite two ends of the pressing member, the annular portion of the headgear located on the side of the opening can be pressed over a greater length on the main frame member by the two fastening devices, as compared with the conventional technique wherein a pressing member is fastened to a main frame member by the combination of a hinging device and a fastening device.

According to a preferred feature of the first aspect of the invention, the each fastening device is selectively placed by a user in a first state in which the each fastening device fastens the pressing member to the main frame member to hold the headgear between the pressing member and the main frame member, and a second state in which the each fastening device unfastens the pressing member from the main frame member. In order to hold the headgear set on the main frame member, each of the two fastening devices is manually operated by the operator to be placed in the first state and, in order to remove the headgear from the main frame member after the sewing machine forms an embroidery on the headgear, the operator has only to operate each fastening device to place it in the second state.

According to another feature of the first aspect of the invention, the each fastening device comprises a manually operable member which is movably supported by one of the pressing member and the main frame member and which is manually movable to fasten the pressing member to the main frame member, and an engageable member which is supported by the other of the pressing member and the main frame member such that the engageable member is engageable with, and disengageable from, the manually operable member and which is engaged with the manually operable member to fasten the pressing member to the main frame member. After the headgear is set on the main frame member and the pressing member is pressed on the headgear being set, the engageable member is engaged with the manually operable member and the manually operable member is manually moved to fasten the pressing member to the main frame member. Thus, the headgear is securely held between the pressing member and the main frame member. The fastening devices enjoy simple construction and ease of use.

According to another feature of the first aspect of the invention, the each fastening device comprises a support member which supports one of the manually operable member and the engageable member which is supported by the main frame member, and wherein a space is provided between the support member and an outer surface of the main frame member, the sweatband unfolded outside being inserted into the space and thereby externally fit on the main frame member. Since a space is provided between the support member and the outer surface of the main frame member, the sweatband unfolded outside is easily inserted into the space without being interfered with by the manually operable member, the engageable member, or the support member. Thus, the headgear is easily and smoothly fit on the main frame member.

According to another feature of the first aspect of the invention, the two fastening devices are provided at two positions corresponding to the right and left temporal portions of the headgear set on the main frame member, respectively. In this case, the operator can easily and fully stretch the right and/or left temporal portion of the headgear on the main frame member, when he or she operates each of the fastening devices to fasten the pressing member to the main frame member. Thus, the sewing machine can form an excellent embroidery on the right and/or left temporal portion of the headgear advantageously held by the headgear holder.

According to a second aspect of the present invention, there is provided a headgear holder for use with a sewing machine, the headgear holder holding a headgear including a covering member which has an opening and covers the head of a person through the opening, and a sweatband which is fixed at a portion thereof to an inner surface of an annular portion of the covering member located on the side of the opening, the sweatband being foldable into an inner space of the covering member and unfoldable outside from the inner space through the opening, the sewing machine forming an embroidery on a sewing portion of the covering member which corresponds to the sweatband folded inside, the headgear holder comprising a main frame member on which the headgear is set such that at least a portion of the sweatband which corresponds to the sewing portion of the covering member is unfolded outside and such that the annular portion of the covering member and the outside unfolded portion of the sweatband externally fit on the main frame member, a pressing member which presses the outside unfolded portion of the sweatband on the main frame member, and a switching device which is operable for placing the pressing member in a first state in which the pressing member presses the outside unfolded portion of the sweatband on the main frame member and in a second state in which the pressing member does not press the outside unfolded portion of the sweatband on the main frame member.

In the headgear holder in accordance with the second aspect of the invention, at least a portion of the sweatband which corresponds to the sewing portion of the covering member is unfolded outside, the annular portion of the covering member and the outside unfolded portion of the sweatband externally fit on the main frame member, and the pressing member presses the outside unfolded portion of the sweatband on the main frame member. Thus, the sewing machine can form an embroidery on the sewing portion of the covering member, without sewing the sweatband that is folded inside when the headgear is worn on a wearer.

According to a preferred feature of the second aspect of the invention, the pressing member includes a first pressing portion which presses the outside unfolded portion of the sweatband, and a second pressing portion which presses a portion of the covering member which is nearer to the opening than the sewing portion of the covering member.

According to another feature of the second aspect of the invention, the headgear additionally including a visor projecting outside from the annular portion thereof, and the pressing member has a shape which assures that the pressing member presses both the outside unfolded portion of the sweatband and the portion of the covering member nearer to the opening, on the main frame member, without being interfered with by the visor of the headgear set on the main frame member.

According to another feature of the second aspect of the invention, the pressing member includes a covering-member pressing portion which extends along, and presses, the portion of the covering member nearer to the opening, two arm portions which project from opposite ends of the covering-member pressing portion, respectively, in a direction which is substantially perpendicular to a direction of extending of the covering-member pressing portion and is substantially parallel to a direction of outside unfolding of the sweatband through the opening, and two sweatband pressing portions which project from the two arm portions, respectively, toward each other in a direction substantially parallel to the direction of extending of the covering-member pressing portion and which cooperate with each other to press the sweatband on the main frame member.

According to another feature of the second aspect of the invention, the headgear holder further comprises a first visor-support member which projects from the main frame member and supports a free end portion of the visor of the headgear set on the main frame member, and at least one hook member which is provided on at least one lengthwise intermediate portion of the covering-member pressing portion, a cord being engageable with the first visor-support member and the hook member to press the visor of the headgear against the first visor-support member. A plurality of hook member may be provided on a plurality of intermediate portions of the covering-member pressing portion, respectively. The cord may be an elastic cord which is elastically stretchable and which elastically presses the visor of the headgear against the first visor-support member. In addition, the portion of the covering member nearer to the opening is pressed with higher stability by the covering-member pressing portion, because the one or more hook members and the covering-member pressing portion are drawn by the cord toward the first visor-support member.

According to another feature of the second aspect of the invention, the headgear holder further comprises at least one second visor-support member which is provided on the main frame member and supports a base portion of the visor of the headgear which is remoted from the free end portion of the visor. The one or more second visor-support members function to position with accuracy the visor of the headgear relative to the main frame member, which contributes to positioning with accuracy the annular portion of the covering member in a direction in which the cord presses the visor against the first visor-support member.

According to another feature of the second aspect of the invention, the second visor-support member is opposed to the hook member, so that the second visor-support member and the hook member cooperate with each other to position the base portion of the visor of the headgear in a direction in which the cord presses the visor against the first visor-support member. A plurality of second visor-support members may be provided to be opposed to a plurality of hook members, respectively. In either case, the visor of the headgear and the covering-member pressing portion of the pressing member are held with stability on the main frame member.

According to another feature of the second aspect of the invention, the switching device comprises two fastening devices each of which fastens a corresponding one of the two arm portions of the pressing member to the main frame member, thereby placing the pressing member in the first state in which the pressing member presses the outside unfolded portion of the sweatband on the main frame member, the each fastening device unfastening the corresponding one arm portion of the pressing member from the main frame member, thereby placing the pressing member in the second state in which the pressing member does not press the outside unfolded portion of the sweatband on the main frame member.

According to a third aspect of the present invention, there is provided a headgear holder for use with a sewing machine, the headgear holder holding a headgear including a covering member which has an opening and covers the head of a person through the opening, the covering member including an annular portion located on the side of the opening, the sewing machine forming an embroidery on the annular portion of the covering member, the headgear holder comprising a main frame member on which the headgear is set such that the annular portion of the covering member externally fits on the main frame member, a pressing member which externally presses the headgear set on the main frame member, and two fastening devices which fasten opposite end portions of the pressing member to the main frame member, respectively, to press the pressing member against the main frame member and thereby hold the headgear between the pressing member and the main frame member, the opposite end portions of the pressing member being unfastenable from the main frame member by the two fastening devices, respectively.

In the headgear holder in accordance with the third aspect of the invention, the two fastening devices are provided corresponding to the opposite two ends of the pressing member, and accordingly the annular portion of the headgear located on the side of the opening is pressed over a greater length on the main frame member by the pressing member, as compared with the conventional technique wherein a pressing member is fastened to a main frame member by the combination of a hinging device and a fastening device. Thus, the sewing machine can easily form an embroidery on a right and/or left temporal portion of the headgear held by the headgear holder.

According to a preferred feature of the third aspect of the invention, the main frame member has a generally cylindrical shape, and wherein each of the two fastening devices comprises a support axis member only one of opposite end portions of which is supported by the main frame member such that a space is provided between the support axis member and an outer circumferential surface of the main frame member and such that the support axis member extends toward the headgear set on the main frame member, in a direction parallel to a center line of the outer circumferential surface of the main frame member, the each fastening device further comprising a rotatable member which is supported by the support axis member such that the rotatable member is rotatable about an axis line of the support axis member relative to the main frame member.

According to another feature of the third aspect of the invention, the rotatable member includes a portion which moves toward the outer circumferential surface and moves away from the pressing member when the each fastening device fastens the pressing member to the main frame member. In the case where the headgear is formed of a cloth sheet or sheets whose thickness is somewhat greater than a distance between the outer circumferential surface of the main frame member and the above-indicated portion of the rotatable member of each fastening device, those portions of the respective rotatable members of the two fastening devices engage the right and left temporal portions of the headgear, respectively, and advantageously stretch the headgear on the main frame member, when the fastening devices cooperate with each other to fasten the pressing member to the main frame member. The rotatable member may comprise a manually operable lever which is provided on the main frame member. In the latter case, an intermediate portion of the lever is rotatably supported by the main frame member, and one of two arms of the lever which extend from the intermediate portion thereof in opposite directions provides a manually operable arm. An engageable member is rotatably supported by the other arm. In this case, too, the lever includes a portion which moves toward the outer circumferential surface of the main frame member and moves away from the pressing member when the corresponding fastening device fastens the pressing member to the main frame member.

According to another feature of the third aspect of the invention, the each fastening device further comprises a spring member which is supported by the rotatable member such that when the each fastening device fastens the pressing member to the main frame member, the spring member is moved with the rotatable member toward the main frame member and is elastically deformed to press the headgear on the main frame member.

According to another feature of the third aspect of the invention, the each fastening device further comprises a manually operable lever which is supported by the pressing member such that the manually operable lever is rotatable relative to the pressing member about an axis line parallel to the center line of the outer circumferential surface of the main frame member, and an engageable member which is supported by an intermediate portion of the manually operable lever such that the engageable member is rotatable about an axis line parallel to the center line of the outer circumferential surface, the engageable member being engageable with the rotatable member, the each fastening device fastening the pressing member to the main frame member, in a stable fastening state thereof in which the each fastening device is placed by the user by engaging the engageable member with the rotatable member and subsequently rotating the manually operable member relative to the pressing member over a dead center of the manually operable member. In this case, the user operates each of the fastening devices to place it in the stable fastening state, while the pressing member is used to press the headgear being fully stretched on the outer circumferential surface of the main frame member. If the rotatable members of the fastening devices each include a portion which moves toward the main frame member and moves away from the pressing member when the fastening devices fasten the pressing member to the main frame member, opposite outer portions of the headgear which are located outside the remaining portion of the headgear being pressed by the pressing member, are drawn by the rotatable members of the two fastening devices, respectively, in directions away from the pressing member, and are pinched between each rotatable member and the main frame member. Thus, the headgear is more advantageously secured onto the outer circumferential surface of the main frame member.

According to another feature of the third aspect of the invention, the rotatable member includes a cylindrical portion which fits on the support axis member such that the cylindrical portion is rotatable about an axis line of the support axis member relative to the main frame member, a bent arm including a base portion which projects, in the stable fastening state of the each fastening device, from the cylindrical portion toward the outer circumferential surface of the main frame member, the bent arm further including a bent portion which projects, in the stable fastening state, from the base portion along the outer circumferential surface toward the pressing member, and an engageable portion which comprises a free end portion of the bent arm and is engageable with the engageable member.

According to another feature of the third aspect of the invention, the engageable member comprises a rink having a generally rectangular shape and including four elongate portions which correspond to four sides of the rectangular shape, respectively, and cooperate with one another to define an inside hole of the rink, and the engageable portion of the rotatable member comprises a hook portion which is engageable with one of the four elongate portions through the inside hole.

According to another feature of the third aspect of the invention, the each of two elongated portions adjacent to the one elongate portion of the rink includes a bent end portion located adjacent to a corresponding one of opposite ends of the one elongate portion. The rink including the two bent portions is elastically extensible and functions as a spring which permits the manually operable lever to be moved manually over the dead center thereof.

According to a fourth aspect of the present invention, there is provided a headgear holder for use with a sewing machine, the headgear holder holding a headgear including a covering member which has an opening and covers the head of a person through the opening, and a sweatband which is fixed at a portion thereof to an inner surface of an annular portion of the covering member located on the side of the opening, the sweatband being foldable into an inner space of the covering member and unfoldable outside from the inner space through the opening, the sewing machine forming an embroidery on each of a frontal portion, and at least one of a right and a left temporal portion, of the annular portion, the headgear holder comprising a main frame member on which the headgear is set such that the sweatband unfolded outside and the annular portion of the covering member externally fit on the main frame member, the main frame member having a generally cylindrical shape and including an outer circumferential surface whose center angle is not smaller than 220 degrees, a pressing member which externally presses the headgear set on the main frame member such that the pressing member presses the headgear against a cooperative portion of the outer circumferential surface of the main frame member, the cooperative portion having a center angle not smaller than 200 degrees, the pressing member having a shape which permits the sewing machine to form the embroidery on the each of the frontal portion, and the at least one of the right and left temporal portions, of the annular portion of the headgear, and a switching device which is operable for placing the pressing member in a first state in which the pressing member presses the headgear on the main frame member and in a second state in which the pressing member does not press the headgear on the main frame member. The main frame member may have a part-cylindrical shape or a fully cylindrical shape.

In the headgear holder in accordance with the fourth aspect of the invention, at least portions of the sweatband which correspond to the frontal portion, and at least one of the right and left temporal portions, of the annular portion of the covering member are unfolded outside and fit on the main frame member which has an outer circumferential surface whose center angle is not smaller than 220 degrees. Therefore, the sewing machine can form an excellent embroidery on each of the frontal portion and the right and/or left temporal portion of the headgear held by the headgear holder, without sewing the sweatband that is folded inside when the headgear is worn on a wearer.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
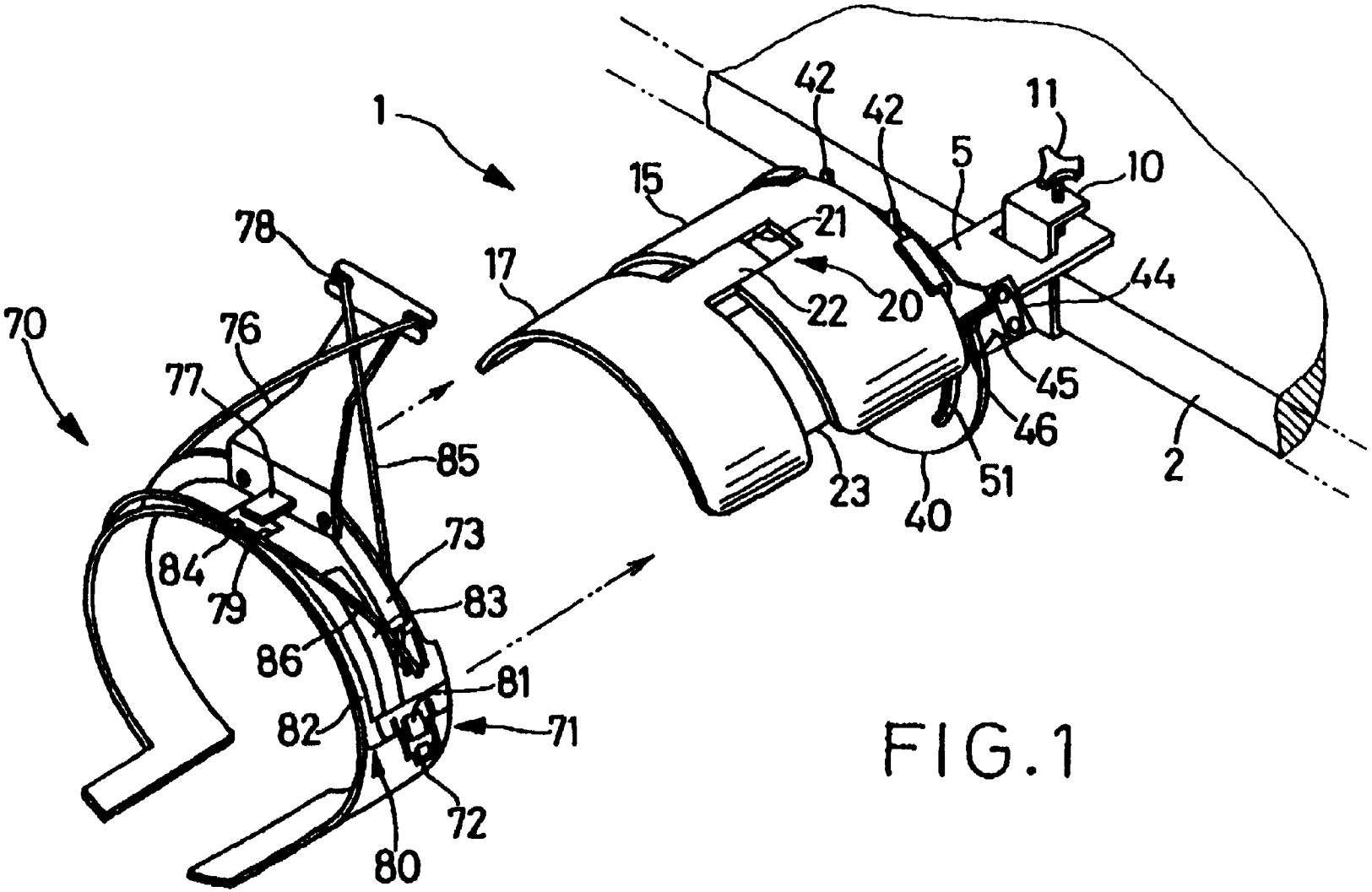
FIG. 1 is a perspective view of a cap-holder supporting apparatus and a cap holder detachably attached to the supporting apparatus.

Referring to FIGS. 1–6, there is shown a cap-holder supporting apparatus 1 to which a cap holder 70 for holding a cap such as a baseball cap is detachably attached.

As shown in FIGS. 1 to 4, the present cap-holder supporting apparatus 1 includes a fixed frame member 5, a first part-cylindrical frame member 15, a second part-cylindrical frame member 17, a guiding device 20, a position changing device 30, a cap-holder supporting rotatable structure 40, a connecting device 50, and a fastening device 60. The fixed frame member 5 is adapted to be fixed to a table 2 as an external base member. The first part-cylindrical frame member 15 is integrally connected to the fixed frame member 5. The second part-cylindrical frame member 17 is provided in front of the first part-cylindrical frame member 15 in such a manner that the position of the second part-cylindrical frame member 17 relative to the first part-cylindrical frame member 15 is changeable with respect to a front-rear direction of the apparatus 1 which is substantially parallel to a common center axis line of the two Part-cylindrical frame members 15, 17 that have a same radius of curvature.

The guiding device 20 guides the movement of the second Part-cylindrical frame member 17 such that the second part-cylindrical frame member 17 is movable relative to the first Part-cylindrical frame member 15 in the front-rear direction only. The position changing device 30 is manually operable for changing the position of the second part-cylindrical frame member 17 relative to the first part-cylindrical frame member 15 in the front-rear direction. The cap holder 70 is detachably attached to the cap-holder supporting rotatable structure 40. With the cap holder 70 being supported on the rotatable structure 40, the first part-cylindrical frame member 15 extends in an inside space of a generally cylindrical main frame member 71 of the cap holder 70, and the second part-cylindrical frame member 17 extends into an internal space of a cap (not shown) held by the cap holder 70.

The connecting device 50 connects the cap-holder supporting rotatable structure 40 to the fixed frame member 5, such that the rotatable structure 40 is rotatable relative to the fixed frame member 5. The fastening device 60 fastens the cap-holder supporting rotatable structure 40 to the fixed frame member 5, in such a manner that the rotatable structure 40 can be unfastened from the frame member 5.

First, the fixed frame member 5 will be described in detail.

Figure 2:
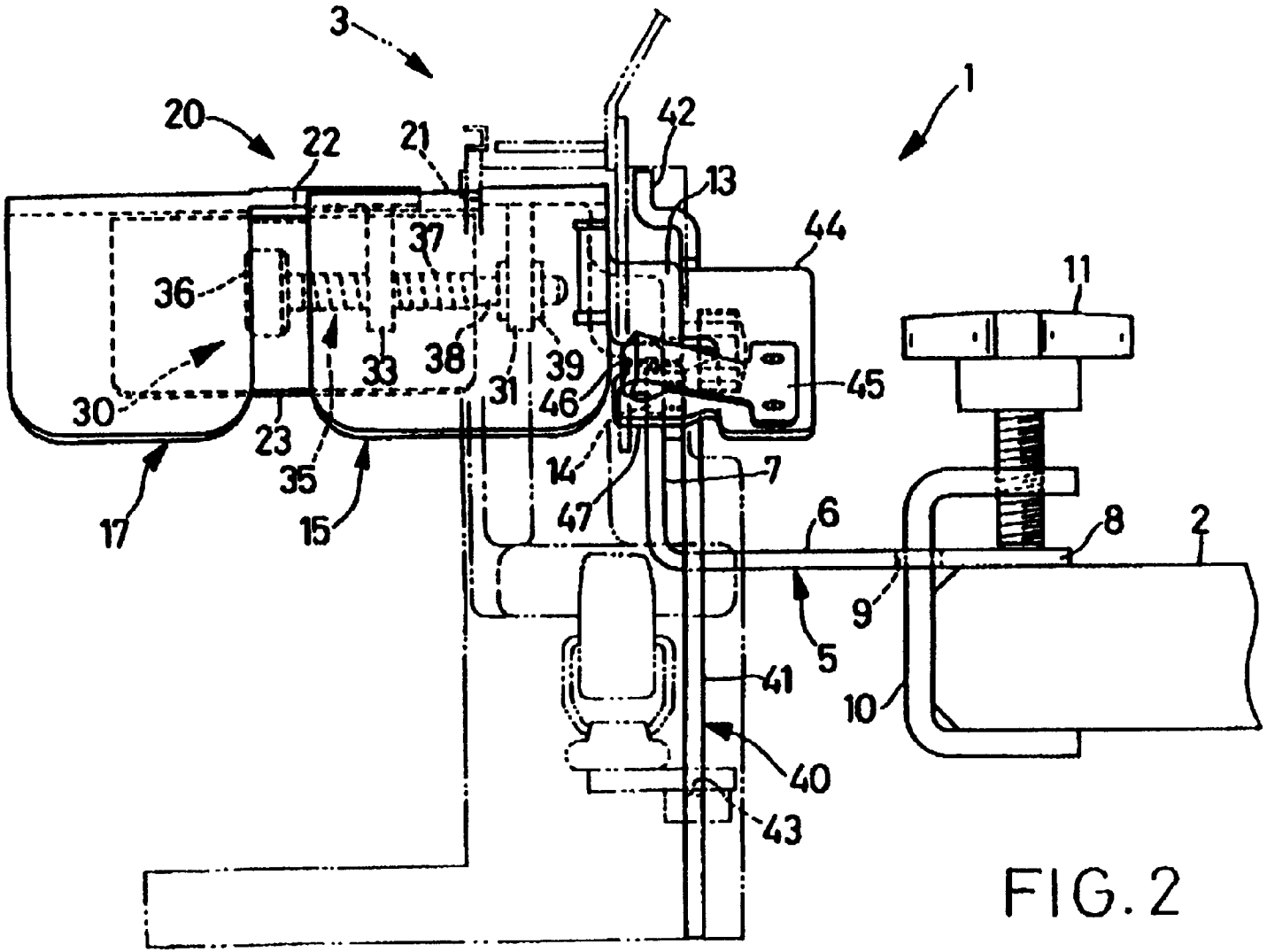
FIG. 2 is a lateral elevation view of the cap-holder supporting apparatus of FIG. 1.
Figure 3:
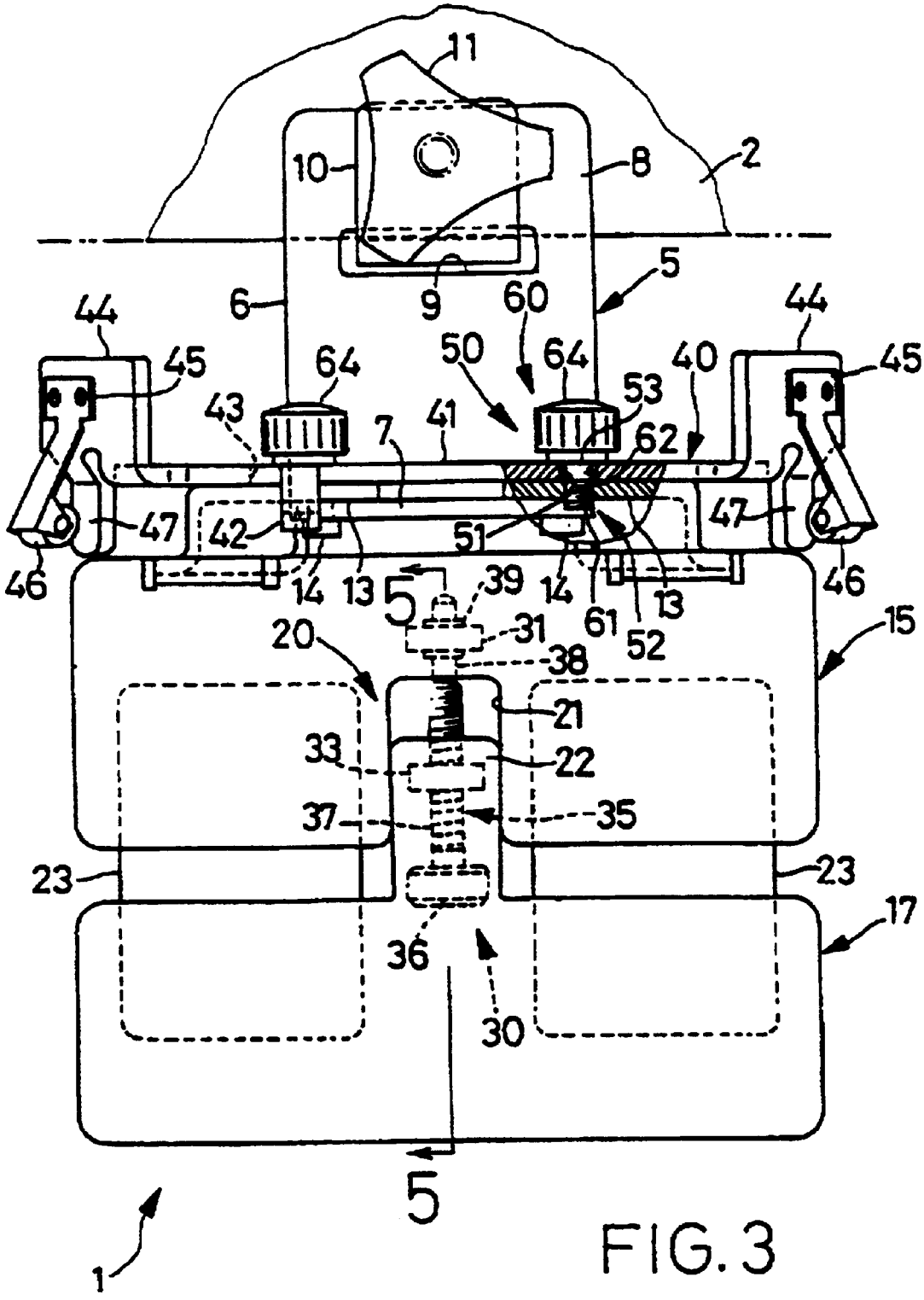
FIG. 3 is a plan view of the cap-holder supporting apparatus of FIG. 1.

As shown in FIGS. 2 and 3, the fixed frame member 5 includes a horizontal portion 6 having a predetermined length in the front-rear direction, and a vertical portion 7 having a length equal to about half the length of the horizontal portion 6. Thus, the fixed frame member 5 is provided by a plate member having an L-shaped cross section as shown in FIG. 2. The horizontal portion 6 includes an end or base portion 8 at which the fixed frame member 5 is fixed to the table 2. The horizontal portion 6 has an elongate hole 9 in front of the base portion 8. A metal member 10 having a U-shaped cross section is inserted through the hole 9, and a fastening bolt 11 is threadedly engaged with a top portion of the metal member 10. The metal member 10 and the fastening hole 11 cooperate with each other to fasten the fixed frame member 5 to the table 2 such that the fixed frame member 5 can be unfastened or released from the table 2.

Two connecting members 13 are fixed with respective bolts 14 to two upper corners of the vertical portion 7 of the fixed frame member 5. A rear end portion of the first part-cylindrical frame member 15 is fixed to respective upper end portions of the connecting members 13. The first part-cylindrical frame member 15 is integrally connected to the fixed frame member 5 via the connecting members 13.

Next, there will be described the first and second part-cylindrical frame members 15, 17 and the guiding device 20.

Figure 5:
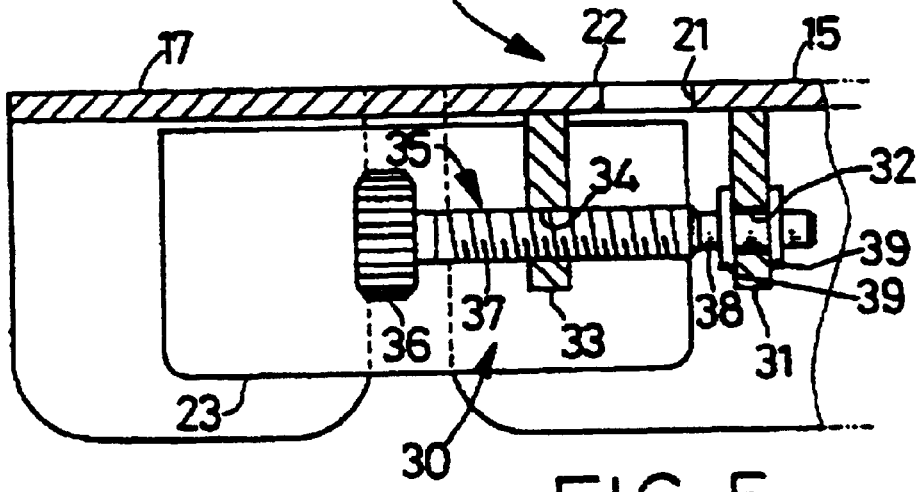
FIG. 5 is a cross-section view taken along line 5—5 in FIG. 3.

As shown in FIGS. 2, 3, and 5, the first part-cylindrical frame member 15 has an engagement recess 21 formed in a top portion of a front end portion thereof. The engagement recess 21 opens in a front end of the first part-cylindrical frame member 15. The second part-cylindrical frame member 17 has an engagement projection 22 projecting rearward from a top portion of a rear end portion thereof. The engagement projection 22 is held in engagement with the engagement recess 21. A pair of part-cylindrical guide plates 23 are fixed, at respective rear portions thereof, to a lower surface of the first part-cylindrical frame member 15. Respective front portions of the two guide plates 23 project frontward from the first part-cylindrical frame member 15, and cooperate with each other to support a lower surface of the second part-cylindrical frame member 17. Thus, the engagement recess and projection 21, 22 and the guide plates 23 cooperate with one another to provide the guiding device 20 for guiding the movement of the second part-cylindrical frame member 17 such that the frame member 17 is movable relative to the first part-cylindrical frame member 15 in the front-rear direction only.

There will be described the position changing device 30 for changing the position of the second part-cylindrical frame member 17 relative to the first part-cylindrical frame member 15 in the front-rear direction.

As shown in FIG. 5, the position changing device 30 includes a first and a second projection 31, 33, and a screw member 35 with a manually operable knob 36. The first projection 31 projects from the lower surface of the first part-cylindrical frame member 15, and the second projection 33 projects from the lower surface of the second part-cylindrical frame member 17. The screw member 35 includes an externally threaded axis portion 37, and a small-diameter axis portion 38 whose diameter is smaller than that of the threaded portion 37. The small-diameter axis portion 38 is inserted through a support hole 32 formed through the thickness of the first projection 31. The small-diameter axis portion 38 is connected, with two ring members 39, such as E rings, provided on both sides of the first projection 31, to the first projection 31 such that the screw member 35 is rotatable about an axis line thereof and is not movable relative to the first projection 31 in the axial direction thereof, i.e., in the front-rear direction. The two ring members 39 may be replaced by two spring pins which are inserted in two holes formed through the axis portion 38, respectively. The threaded axis portion 37 is inserted through, and engaged with, an internally threaded hole 34 formed through the thickness of the second projection 33. The knob 36 is secured to a front end of the threaded axis portion 37. When the knob 36 is manually rotated by an operator or worker, the screw member 35 is rotated about the axis line thereof, so that the second part-cylindrical frame member 17 is moved via the second projection 33 relative to the first part-cylindrical frame member 15 in the front-rear direction, while being guided by the guiding device 20. Thus, the position of the second part-cylindrical frame member 17 is changed relative to the first part-cylindrical frame member 15 in the front-rear direction.

There will be described the cap-holder supporting rotatable structure 40.

Figure 4:
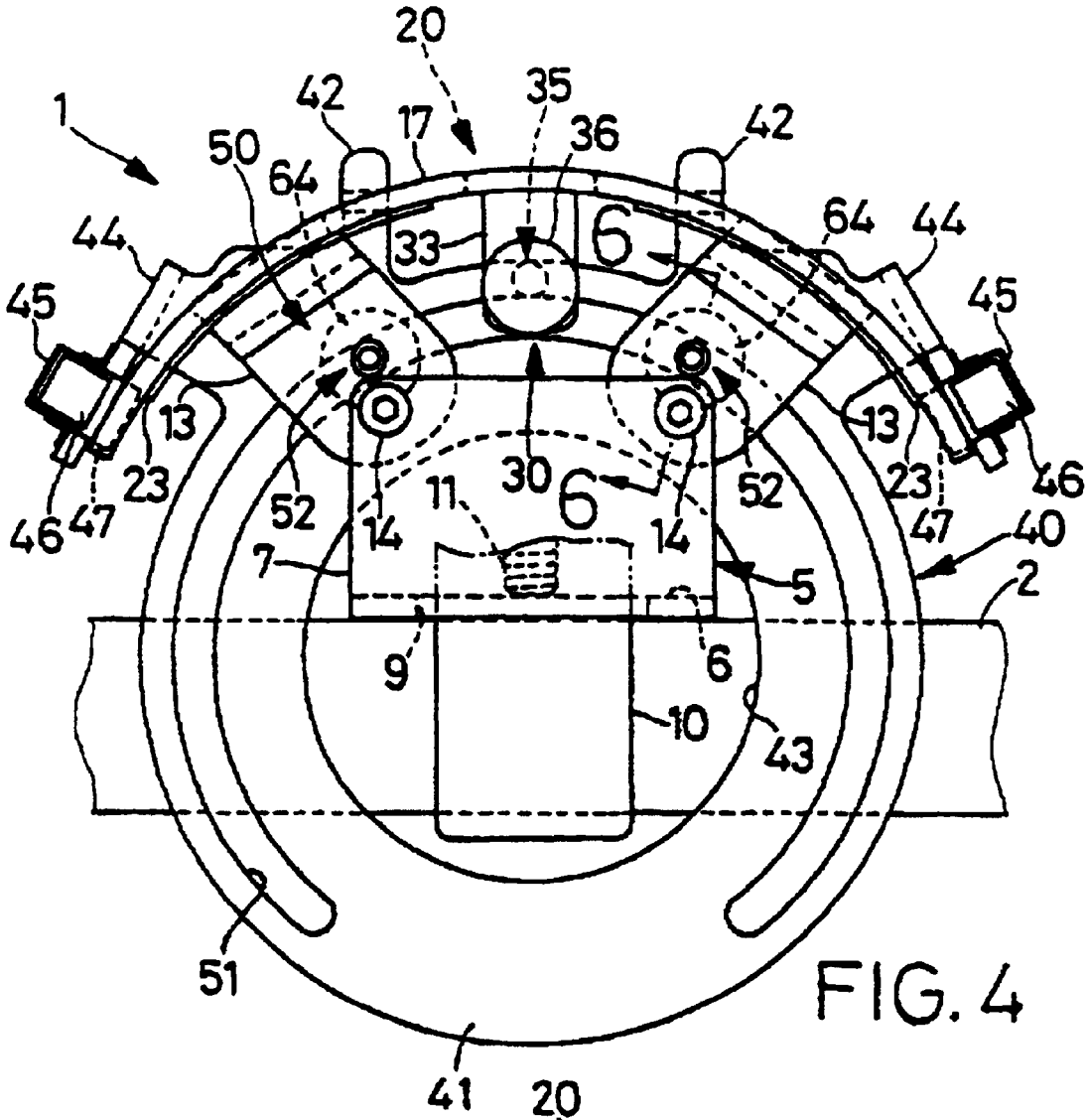
FIG. 4 is a front elevation view of the cap-holder supporting apparatus of FIG. 1.

As shown in FIGS. 2 to 4, the cap-holder supporting rotatable structure 40 includes a disc-like wall member 41, and a pair of crank-like upward projections 42 projecting upward from a top portion of the wall member 41. The wall member 41 has an insertion hole 43 which is concentric with the disc-like wall member 41 and whose diameter is equal to about three fifths of that of the wall member 41. The wall member 41 also has an arcuate slit 51 located radially outwardly of the insertion hole 43. The arcuate slit 51 is concentric with the wall member 41, and extends over about 290 degrees around the insertion hole 43.

The rotatable structure 40 additionally has a pair of roller supporting portions 44 which are located outside the two upward projections 42, respectively, and each of which projects rearward from the top portion of the wall member 41. Each roller supporting portion 44 supports a roller member 46 via a sheet-like spring 45. A front half portion of the sheet-like spring 45 extends frontward over the wall member 41, and a rear end portion of the spring 45 is fixed with vises to the supporting portion 44. The roller member 46 is supported by a front end portion of the spring 45 such that the roller member 46 is rotatable about an axis member. Each roller supporting portion 44 includes a plate-like guide portion 47 which projects frontward from a front end of the supporting portion 44, over the wall member 41, and which is opposed to a corresponding roller member 46. The two roller members 46 and the two guide portions 47 cooperate with one another to pinch and hold a rear end portion of the cylindrical main frame member 71 of the cap holder 70. The two guide portions 47 cooperate with each other to guide the movement of the rear end portion of the main frame member 71 when the operator attaches the cap holder 70 to the rotatable structure 40. The upward projections 42 and the roller supporting portions 44 are integrally formed with the wall member 41.

A front end portion of the horizontal portion 6 of the fixed frame member 5 is inserted through the insertion hole 43 of the wall member 41, and the rotatable structure 40 is connected, by the connecting device 50, to the two connecting members 13 secured to the vertical portion 7 of the fixed frame member 5, such that the rotatable structure 40 is rotatable about a center axis line of the disk-like wall member 41 that is coaxial with the center axis line of the first and second part-cylindrical frame members 15, 17.

Next, there will be described the connecting device 50 and the fastening device 60.

Figure 6:
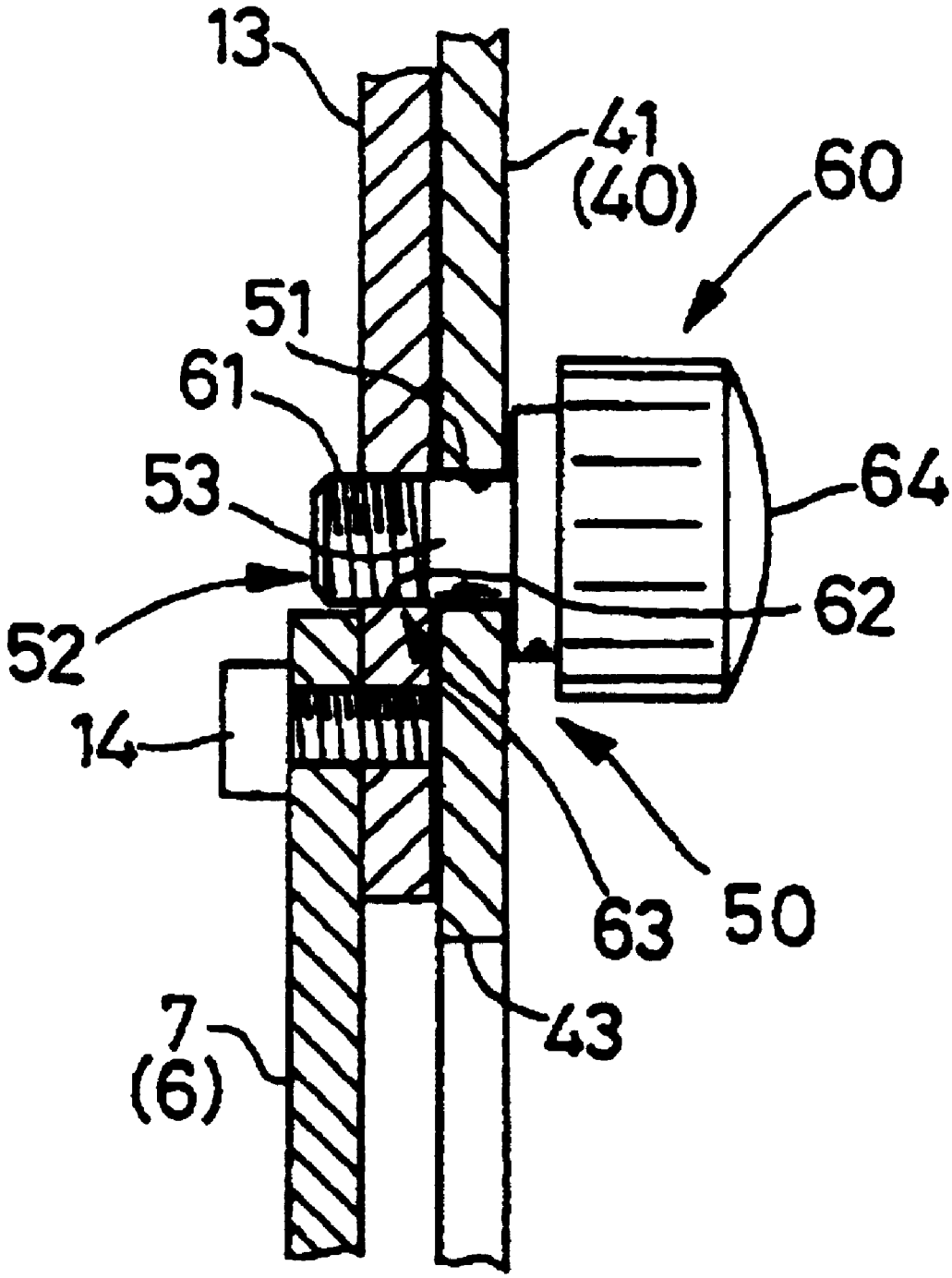
FIG. 6 is a cross-section view taken along line 6—6 in FIG. 4.

As shown in FIGS. 4 and 6, the connecting device 50 includes the arcuate slit 51 formed through the thickness of the wall member 41 of the rotatable structure 40, and a pair of pin members 52 which are threadedly engaged with the two connecting members 13, respectively, and which extend through the arcuate slit 51. More specifically described, each pin member 52 has an axis portion 53 which extends through the arcuate slit 51 of the rotatable structure 40, and an externally threaded end portion 61 which is integrally formed with the axis portion 53 and which is threadedly engaged with an internally threaded hole 62 of a corresponding connecting member 13.

The fastening device 60 includes the two pin members 52, and two threaded portions 63 and a knob 64 which are associated with each of the two pin members 52. Each of the two threaded portions 63 are provided by the threaded portion 61 and the threaded hole 62. When each knob 64 is manually rotated by the operator, a distance between the knob 64 and a corresponding connecting member 13 decreases because of the threaded engagement of the two threaded portions 63 (61, 62), so that the rotatable structure 40 is sandwiched and fixed by being pinched by the knob 64 and the connecting member 13.

Next, there will be described the cap holder 70 which is attached to the present cap-holder supporting apparatus 1 constructed as described above.

As shown in FIG. 1, the cap holder 70 includes the cylindrical main frame member 71 which has a predetermined length in the front-rear direction and which is detachably attached to the rotatable structure 40. The cap holder 70 additionally includes a pressing frame member 80 which is externally and detachably attached to the cylindrical main frame member 71 with a cap being held therebetween. The pressing frame member 80 has two connecting metal members 81 (only one 81 is shown in FIG. 1) provided at opposite ends thereof. Each metal member 81 is connectable to a corresponding one of two hook members 72 (only one 72 is shown) provided on the cylindrical main frame member 71.

The rear end portion of the cylindrical main frame member 71 has four engageable holes (not shown) which are engageable with the two upward projections 42, and the two pairs of roller members 46 and guide portions 47, of the rotatable structure 40, respectively. The cap holder 70 has a partial flange member 73 provided on an intermediate portion thereof as seen in the front-rear direction. The partial flange member 73 has two pairs of recesses formed in opposite end portions thereof, respectively. A visor supporting member 76 for supporting the visor of the cap is fixed to a top portion of the flange member 73, such that the visor supporting member 76 extends obliquely, i.e., upward and rearward. The visor supporting member 76 has two recesses 78 formed in a top end portion thereof. A first elastic cord 85 is engaged with the recesses 78 for biasing the visor of the cap in the rearward direction against the visor supporting portion 76. Each of opposite end portions of the first elastic cord 85 is connected to one recess of a corresponding one pair out of the two pairs of recesses of the partial flange portion 73.

A stopper member 77 is fixed to a bottom portion of the visor supporting member 76, for internally contacting a middle portion of a curved base portion of the visor of the cap. The cylindrical main frame member 71 has a recess 79 formed through the thickness of a top portion thereof. Under the pressing frame member 80, a cloth-based, soft, frontal portion of the cap is so deformed as to enter the recess 79. The pressing frame member 80 includes a pressing frame portion 82 with a small width, and a pair of right and left pressing strips 83 (only the right one 83 is shown). The pressing frame portion 82 extends along the curved base portion of the visor of the cap, and presses the frontal portion of the cap and respective front-side half portions of the right and left temporal portions of the cap, against the cylindrical main frame member 71. The two pressing strips 83 press, against the main frame member 71, a sweat absorbing member of the cap being unfolded and kept outside. A hook member 84 having a U-shaped cross section is fixed to a top, middle portion of the pressing frame portion 82. A middle portion of a second elastic chord 86 is engaged with the hook member 84, and each of opposite end portions of the second elastic chord 86 is connectable to the other recess of a corresponding one pair out of the two pairs of recesses of the partial flange portion 73.

Next, there will be described the manner in which the cap holder 70 is attached to the cap-holder supporting apparatus 1. As described above, the first part-cylindrical frame member 15 is fixed via the two connecting members 13 to the fixed frame member 5 which in turn is fixed to the table 2 with the help of the metal member 10 and the fastening bolt 11.

In the above-indicated state, the operator or worker sets a cap on the cap holder 70, as follows: First, the position of the second part-cylindrical frame member 17 relative to the first part-cylindrical frame member 15 is changed, as needed, to an appropriate position corresponding to a depth of the cap being set. The position changing device 30 is manually operable for moving the second part-cylindrical frame member 17 relative to the first part-cylindrical frame member 15 in the front-rear direction. The second part-cylindrical frame member 17 is permitted, by the guiding device 20, to move relative to the first part-cylindrical frame member 15, only in the front-rear direction. The changing of the position of the second part-cylindrical frame member 17 may be carried out either before or after the cap holder 70 is attached to the cap-holder supporting apparatus 1.

Subsequently, the cap holder 70 is attached to the cap-holder supporting apparatus 1. First, the cap holder 70 is positioned above the disc-like wall member 41 of the rotatable structure 40, and then is moved downward, so that the two engageable holes provided in an upper portion of the cap holder 70 are engaged with the two upward projections 42 of the rotatable structure 40, respectively. The positioning of the cap holder 70 relative to the rotatable structure 40 is easily achieved by engaging the two holes of the holder 70 with the two projections 42 of the structure 40. In this state, the cap holder 70 is slightly inclined.

Next, the rear end of the cylindrical main frame member 71 of the cap holder 70 is pressed against the respective front ends of the roller supporting portions 44 of the rotatable structure 40. In this step, the rear end of the cylindrical main frame member 71 is guided by the two guide portions 47 of the rotatable structure 40, and the two roller members 46 are engaged, under the elastic forces of the sheet-like springs 45, with the remaining, two holes of the cap holder 70, respectively. Thus, the cap holder 70 is securely attached to the cap-holder supporting apparatus 1, with the upper two holes of the former 70 being engaged with the two upward projections 42 of the latter 1 and with the lower two holes of the former 70 being engaged with the two roller members 46 and guide portion 47 of the latter 1. Since the upper portion of the cap holder 70 is engaged with the upper projections 42, the cap holder 70 is easily engaged with the roller members 46, with a small pressing force, by utilizing the principle of the lever, i.e., by rotating the cap holder 70 about the projections 42.

Next, there will be described the manner in which a cap is set on the cap holder 70 supported by the cap-holder supporting apparatus 1. First, after the pressing frame member 80 is taken off the cylindrical main frame member 71, the cap is put on the main frame member 71, by being moved in the rearward direction. Next, the pressing frame member 80 externally fits on the cap, so that the cap is pinched between the pressing frame member 80 and the main frame member 71. Subsequently, in order to move one of the two temporal portions of the cap to an appropriate position easily visible or accessible by the operator, the cap holder 70 is rotated with the rotatable structure 40, relative to the fixed frame member 5, owing to the connecting device 50. Thereafter, the cap holder 70 is stopped at the appropriate angular position, by inhibiting the free rotation of the rotatable structure 40 with the help of the fastening device 60. In this state, the operator can minutely adjust or correct the position and shape of the cap being held on the cap holder 70, and connects the metal members 81 of the pressing frame member 80 to the hook members 72 of the main frame member 71. Thus, the setting of the cap on the cap holder 70 is completed.

The two lower holes of the cap holder 70 can easily be released from the two roller members 46 and guide portions 47 of the rotatable structure 40, respectively, by drawing lower portions of the cap holder 70 in the frontward direction. Subsequently, the two upper holes of the cap holder 70 can be disengaged from the upward projections 42, while the cap holder 70 as a whole is moved in the upward direction. Thus, the cap holder 70 is detached from the cap-holder supporting apparatus 1.

Subsequently, the cap holder 70 on which the cap is held is attached to an embroidery sewing machine (not shown), so that an embroidery is formed, by the sewing machine, in an embroidery area or areas of the cap.

When the cap holder 70 is detached from the cap-holder supporting apparatus 1 and subsequently is attached to the embroidery sewing machine, the shape of the embroidery area or portion of the cap being held by the cap holder 70 may be deformed or deteriorated to some degree. However, since the cap has been set on the cap holder 70 with the embroidery area portion thereof being stretched with advantages, the cap can easily be restored to an appropriate shape even after the cap holder 70 is attached to the sewing machine. There is known an embroidery sewing machine having an exclusive device for stretching an embroidery area or portion of a cap being held on a cap holder.

As is apparent from the foregoing description, in the present cap-holder supporting apparatus 1, the rotatable structure 40 is rotatably connected, by the connecting device 50, to the two connecting members 13 fixed to the fixed frame member 5. Therefore, the cap holder 70 being attached to the rotatable structure 40 can be rotated around the first part-cylindrical frame member 15. Thus, the operator can easily move, to the top position easily visible from the operator, an embroidery area in a temporal portion of the cap which portion is not easily visible from the operator. Thus, the operator can easily adjust or correct the position and shape of the cap being held on the cap holder 70. Accordingly, the amount of working of the operator is reduced and the working efficiency is improved.

In addition, the connecting device 50 enjoys a simple construction which is provided by the arcuate slit 51 formed in the rotatable structure 40, and the two pin members 52 which are associated with the two connecting members 13, respectively, and which extend through the arcuate slit 51. This leads to reducing the production cost of the present cap-holder supporting apparatus 1.

Since the present cap-holder supporting apparatus 1 is provided with the fastening device 60 for fastening the rotatable structure 40 to the fixed frame member 5 such that the structure 40 can be unfastened from the member 5, the cap holder 70 being attached to the rotatable structure 40 can be stopped at an appropriate angular position where the operator can easily adjust the position and shape of the cap being held on the cap holder 70. Thus, the cap can easily be set on the cap holder 70 such that the cap has an appropriate position and shape.

The fastening device 60 enjoys a simple construction which is provided by the two pin members 52, and the threaded portions 63 and knob 64 associated with each pin member 52. This leads to reducing the production cost of the present cap-holder supporting apparatus 1. In addition, since the fastening device 60 shares the pin members 52 with the connecting device 50, the present apparatus 1 enjoys a simple construction.

The second part-cylindrical frame member 17 is provided in front of the first part-cylindrical frame member 15 such that the position of the second frame member 17 is changeable relative to the first frame member 15 in the front-rear direction. Therefore, the present cap-holder supporting apparatus 1 can be applied to caps in various sizes (in particular, in various depths), by changing the position of the second part-cylindrical frame member 17 relative to the first part-cylindrical frame member 15. Thus, each cap can be set on the cap holder 70 such that an embroidery area or portion of the cap is stretched in an appropriate fashion.

The guiding device 20 guides the movement of second part-cylindrical frame member 17 such that the second frame member 17 is movable relative to the first part-cylindrical frame member 15 in the front-rear direction only. Thus, the second frame member 17 can easily and reliably be moved relative to the first frame member 15.

The guiding device 20 enjoys a simple construction which is provided by the engagement recess 21 of the first part-cylindrical frame member 15, the engagement projection 22 of the second part-cylindrical frame member 17, and the part-cylindrical guide plate 23 which are fixed to the lower surface of the first frame member 15 and which project to support the lower surface of the second frame member 17.

Since the present cap-holder supporting apparatus 1 is provided with the position changing device 30 for changing the position of the second part-cylindrical frame member 17 in the front-rear direction, the operator can easily change the position of the second part-cylindrical frame member 17 relative to the first part-cylindrical frame member 15.

In addition, the position changing device 30 enjoys a simple construction which is provided by the first projection 31 projecting from the lower surface of the first part-cylindrical frame member 15, the second projection 33 projecting from the lower surface of the second part-cylindrical frame member 17, and the screw member 37 which is rotatably connected to the first projection 31 and is threadedly engaged with the threaded hole 34 of the second projection 33. Since the screw member 37 has the manually operable knob 36, the operator can easily operate the position changing device 30 by manually rotating the knob 36 of the screw member 36.

Figure 7:
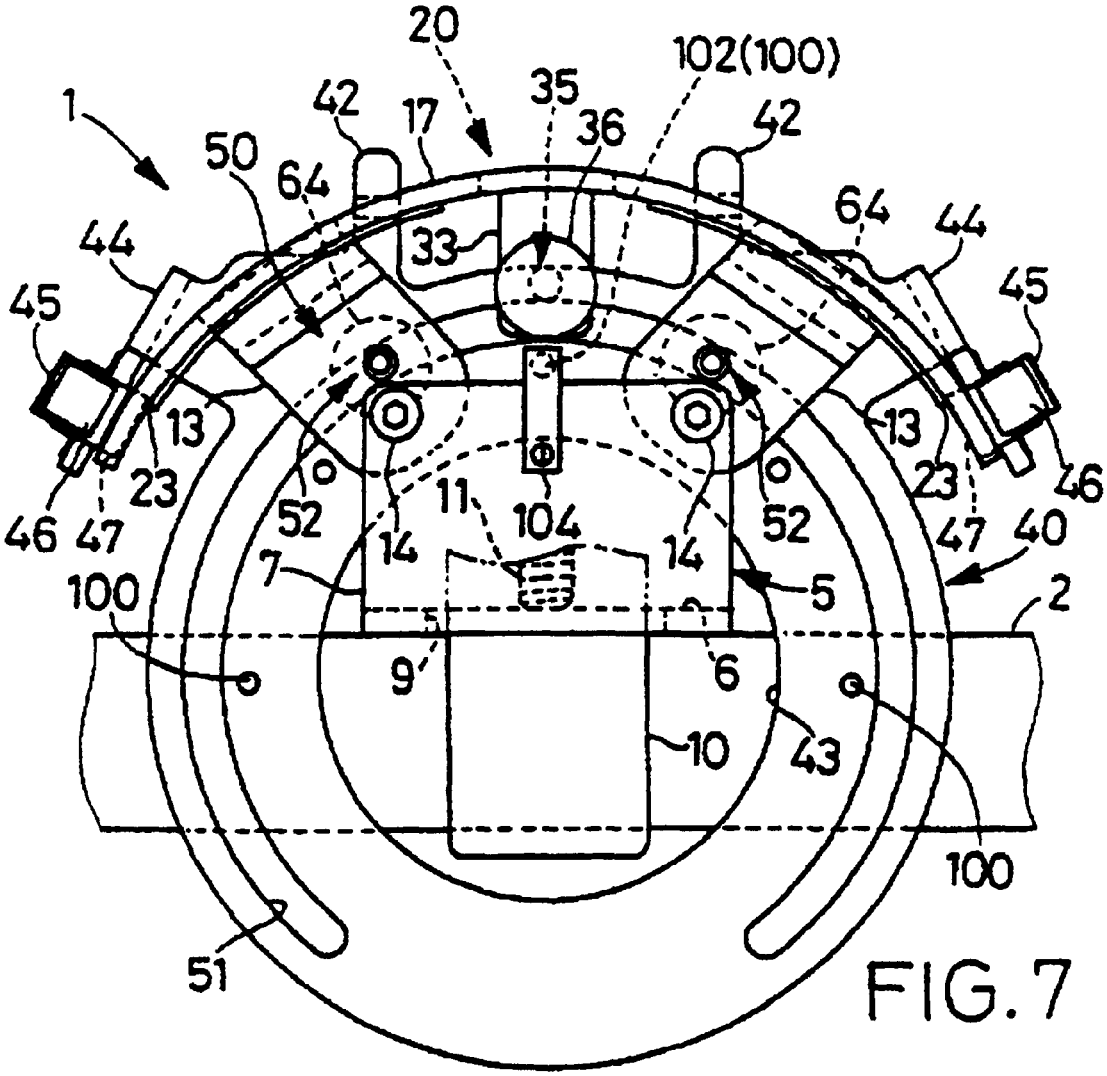
FIG. 7 is a front elevation view corresponding to FIG. 4, showing another cap-holder support apparatus.

Referring next to FIG. 7, there is shown another cap-holder supporting apparatus having a construction similar to that of the first apparatus shown in FIGS. 1–6, and is different from the first apparatus in that in the second apparatus a rotatable structure 40 has a plurality of engageable holes 100 which are equiangularly spaced from one another about a rotation axis line of the structure 40 and that a sheet-like spring 104 having an engageable projection 102 is secured to a fixed frame member 5. Owing to an elastic deformation of the spring 104, the projection 102 is engageable with each of the holes 100 when the rotatable structure 40 is rotated about the rotation axis line. Since the projection 102 is supported by the sheet-like spring 104, the projection 102 engages, by snap action, each hole 100, thereby inhibiting the rotatable structure 40 from being freely rotated relative to the fixed frame member 5. Thus, the holes 100, projection 102, and spring 104 cooperate with one another to provide a snap-action device serving as a free-rotation inhibiting device. Owing to the free-rotation inhibiting device, the rotatable structure 40 is easily rotated and stopped at a desired angular position. In the second apparatus, the free-rotation inhibiting device may be employed in addition to, or in place of, the fastening device 60 of the first apparatus shown in FIG. 6.

Figure 8:
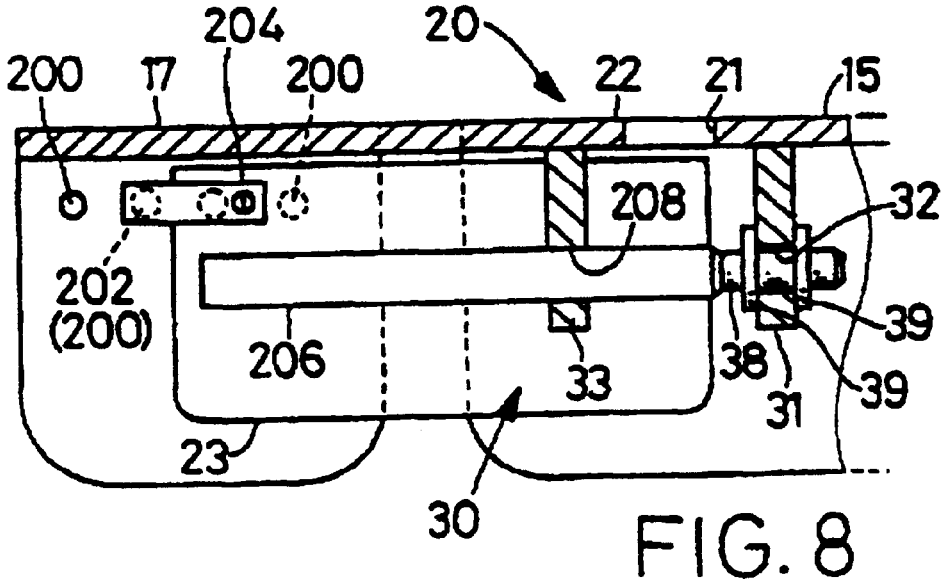
FIG. 8 is a cross-section view corresponding to FIG. 5, showing another cap-holder supporting apparatus.

Referring next to FIG. 8, there is shown another cap-holder supporting apparatus having a construction similar to that of the first apparatus shown in FIGS. 1–6, and is different from the first apparatus in that in the third apparatus a second part-cylindrical frame member 17 has a plurality of engageable holes 200 which are equidistant from one another in a front-rear direction of the cap-holder supporting apparatus and that a sheet-like spring 204 having an engageable projection 202 is secured to one of two part-cylindrical guide plates 23 secured to a first part-cylindrical frame member 15. Owing to an elastic deformation of the spring 204, the projection 202 is engageable with each of the holes 200 when the position of the second part-cylindrical frame member 17 is changed relative to the first part-cylindrical frame member 15 in the front-rear direction. Since the projection 202 is supported by the sheet-like spring 204, the projection 202 engages, by snap action, each hole 200, thereby inhibiting the second frame member 17 from being freely moved relative to the first frame member 15. A guide bar 206 is connected to a first projection 31 such that the guide bar 206 is not movable in an axial direction thereof, i.e., the front-rear direction. The guide bar 206 extends through a guide hole 208 formed through a second projection 33. When the second frame member 17 is moved relative to the first frame member 15, the guide bar 206 guides the movement of the second frame member 17 in the front-rear direction only. Thus, the holes 200, projection 202, and spring 204 cooperate with one another to provide a snap-action device serving as a position changing device 30 for changing the position of the second frame member 17 relative to the first frame member 15 in the front-rear direction. Owing to the position changing device, the second frame member 17 is easily moved and stopped at a desired position in the front-rear direction. In the third apparatus, an engagement recess 21, an engagement projection 22, part-cylindrical guide plates 23, first and second projections 31, 33, and guide bar 206 cooperate with one another to provide a guiding device 20 for guiding the movement of the second frame member 17 relative to the first frame member 15 in the front-rear direction.

Figure 9:
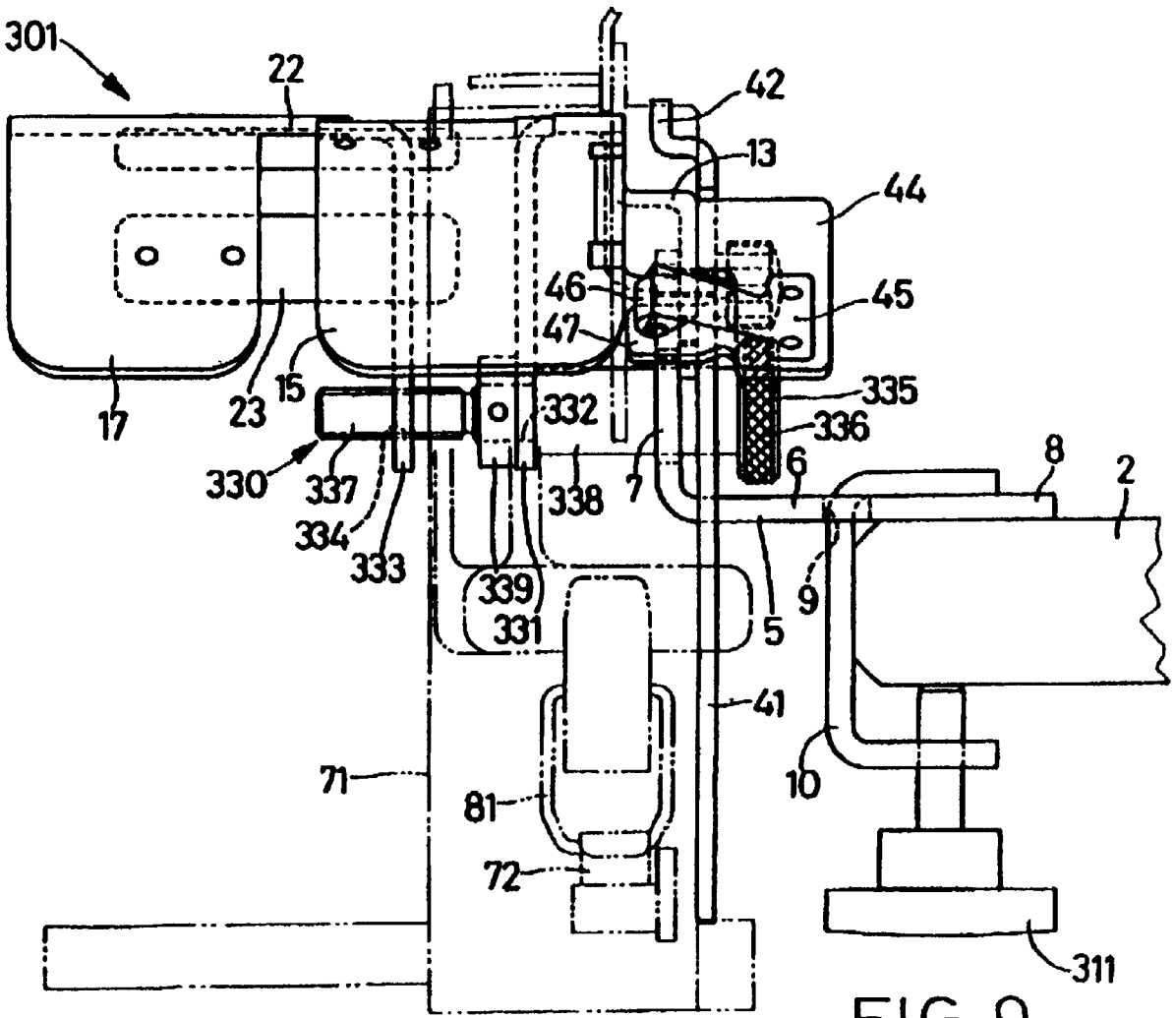
FIG. 9 is a lateral elevation view corresponding to FIG. 2, showing another cap-holder supporting apparatus.

Referring next to FIG. 9, there is shown another cap-holder supporting apparatus 301 having a construction similar to that of the first apparatus shown in FIGS. 1–6, and is different from the first apparatus in that the fourth apparatus has a fastening bolt 311 which is threadedly engaged with a lower portion of a metal member 10 and which is rotatable to fasten or unfasten the metal member 10 to or from a table 2 and thereby fix and release the cap-holder supporting apparatus 301 to and from the table 2. In addition, the fourth apparatus has a position changing device 330 different from the position changing device 30 of the first apparatus.

As shown in FIG. 9, the position changing device 330 includes a first and a second projection 331, 333, and a screw member 335 with a manually operable knob 336. The first projection 331 projects from a lower surface of a first part-cylindrical frame member 15, and the second projection 333 projects downward from a rear end of an engagement projection 22 of a second part-cylindrical frame member 17. The screw member 335 includes an externally threaded axis portion 337, and a large-diameter axis portion 338 whose diameter is larger than that of the threaded portion 337. The larger-diameter axial portion 338 includes a stepped portion which is inserted through a support hole 332 formed through the thickness of the first projection 331. The small-diameter axis portion 338 is connected, with one ring member 339, such as an E-shaped ring, provided on one side of the first projection 331, to the first projection 331 such that the screw member 335 is rotatable about an axis line thereof and is not movable relative to the first projection 331 in the axial direction thereof, i.e., in the front-rear direction. The ring member 339 may be replaced by a spring pin which is inserted in a hole formed through the stepped portion of the axis portion 338. The externally threaded axis portion 337 is inserted through, and engaged with, an internally threaded hole 334 formed through the thickness of the second projection 333. The large-diameter axis portion 338 extends rearward through an insertion hole of a vertical portion 7 of a fixed frame member 5 and an insertion hole 43 of a disc-like wall member 41. The knob 336 is secured to a rear end of the large-diameter axis portion 338, and is positioned rearward of the disc-like wall member 41 of a cap-holder supporting rotatable structure 40. When the knob 336 is manually rotated by an operator or worker, the screw member 335 is rotated about the axis line thereof, so that the second part-cylindrical frame member 17 is moved via the second projection 333 relative to the first part-cylindrical frame member 15 in the front-rear direction, while being guided by a guiding device 20. Thus, the position of the second part-cylindrical frame member 17 is changed relative to the first part-cylindrical frame member 15 in the front-rear direction.

In the fourth apparatus, since the knob 336 is provided between the cap-holder supporting rotatable structure 40 and the table 2, the position of the second part-cylindrical frame member 17 can easily be changed by rotating the knob 336, even with a cap holder 70 and a cap being attached to the rotatable structure 40.

In the first apparatus shown in FIGS. 1 to 6, the connecting device 50 includes the two pin members 52 each of which is supported by a corresponding one of the two connecting members 13 and each extends through the arcuate slit 51 of the rotatable structure 40. However, it is possible that two or more pin members 52 be supported by each connecting member 13 so as to extend through the arcuate slit 51.

Although the arcuate slit 51 of the wall member 41 of the rotatable structure 40 has the central angle of 290 degrees, it is possible that the arcuate slit 51 be formed to have a central angle other than 290 degrees for the purpose of improving the work efficiency.

While in the first apparatus the fastening device 60 is provided by the two pin members 52 and the threaded portions 63 (61, 62) and knob 64 associated with each pin member 52, it is possible that the fastening device 60 be provided by either one of the two pin members 52 and the threaded portions 63 and knob 64 associated with the single pin member 52. Also in the above-indicated modified case where two or more pin members 52 are supported by each connecting member 13 and extend through the arcuate slit 51, it is possible that the fastening device 60 be provided by at least one of the two or more pin members 52 and the threaded portions 63 and knob 64 associated with the one pin member 52.

Although in the first apparatus the guiding device 20 includes the engagement recess 21 of the first part-cylindrical frame member 15 and the engagement projection 22 of the second part-cylindrical frame member 17, it is possible that the guiding device 20 include an engagement recess formed in the second frame member 17 and an engagement projection extending from the first frame member 15.

In the first apparatus, the position changing device 30 includes the screw member 35 which is rotatably connected to the first projection 31 and is threadably engaged with the second projection 33. However, it is possible that the first projection 31 have an internally threaded hole and the second projection 33 has a support hole and that a screw member includes an externally threaded, end portion which is threadedly engaged with the internally threaded hole of the first projection 31, and also include an intermediate axis portion which is rotatably connected to the second projection 33 such that the screw member is not movable relative to the second projection 33 because of the provision of ring members like the members 39. In the latter case, too, the screw member may have a manually operable knob at the same position as the position where the screw member 35 has the knob 36 as shown in FIG. 5.

The cap-holder supporting apparatus 1 may be used to support various sorts of cap holders each of which can be attached to the rotatable structure 40.

Figure 22:
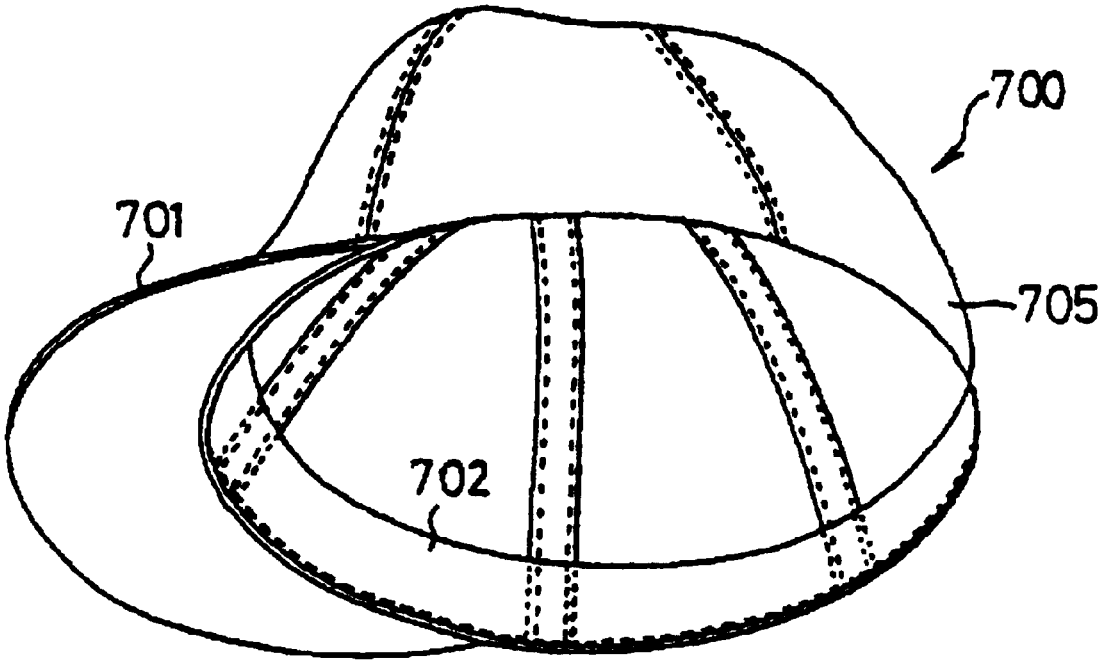
FIG. 22 is a perspective view of a cap as an example of a headgear.

Referring next to FIGS. 10 to 19, there will be described a cap holder 580 embodying the present invention. The cap holder 580 holds a cap 700 (FIG. 22), such as a baseball cap, which is detachably attached thereto. The cap 700 has a sweatband or a sweat absorbing member 702, and an annular portion 705 defining an opening through which the head of a wearer fits in the cap 700. The cap 700 is formed of a cloth, and the sweat absorbing member 702 is formed of a cloth different from the cloth of the remaining portion of the cap 700 and has a thickness smaller than that of the remaining portion of the cap 700. However, the principle of the present invention is generally applicable to a headgear holder for holding a headgear detachably attached thereto.

The cap holder 580 is used with a multiple-head embroidering machine, SM, which includes three multiple-needle sewing heads, M1, M2, M3, each of which has an identical structure. Each sewing head M1-M3 may be used with a cap holding device 520 including the cap holder 580, to form stitches of an embroidery on the cap 700 held by the cap holder 580.

Figure 10:
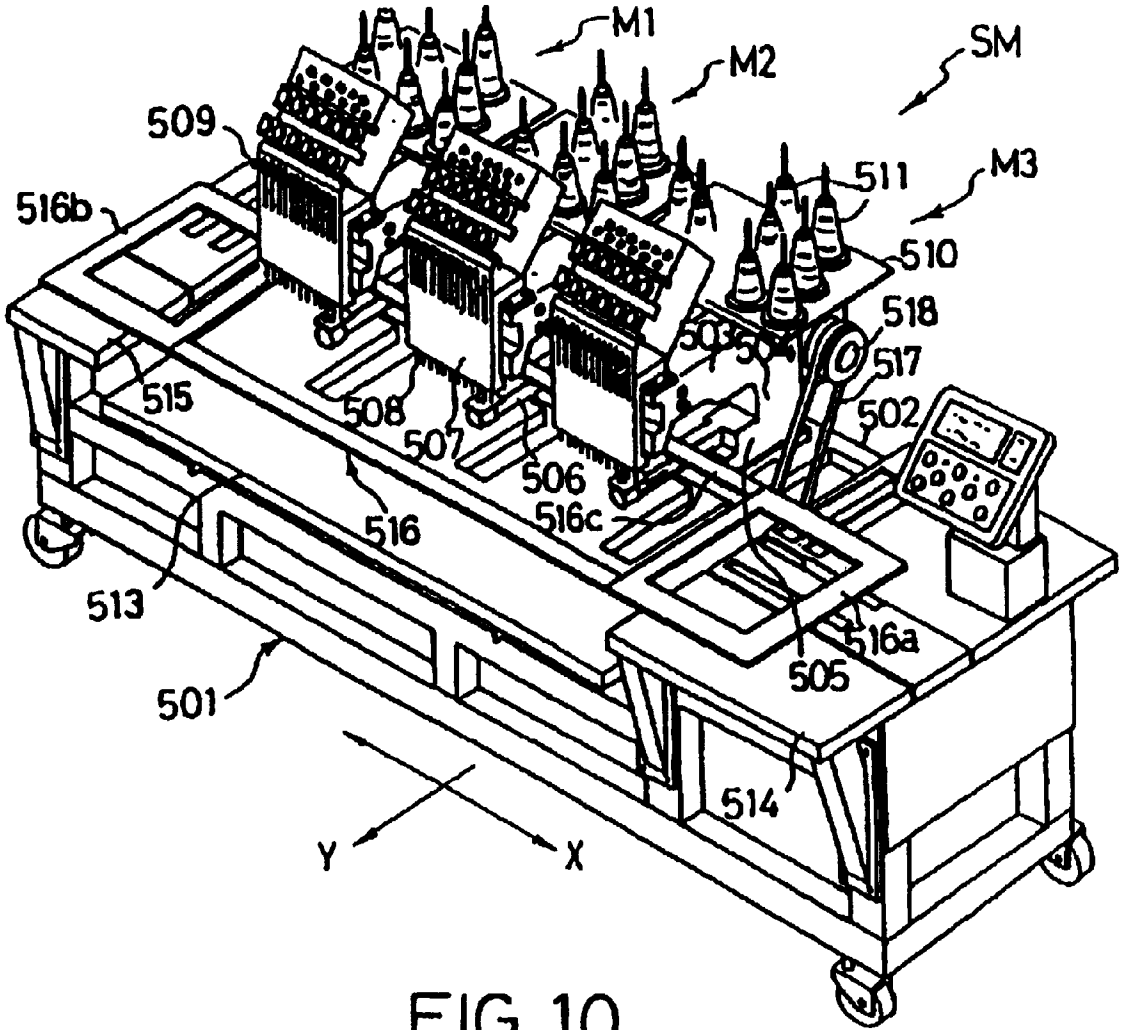
FIG. 10 is a perspective view of a multiple-head embroidering machine with which a cap holding device including a cap holder embodying the present invention is used.

The sewing machine SM includes a machine table 501 which is long in an X direction and short in a Y direction perpendicular to the X direction (the X and Y directions are indicated at arrows in FIG. 10). On a rear portion of the machine table 501, there is disposed a base plate 502 which has an elongate rectangular shape extending in the X direction. On the base table 502, there are disposed the three sewing heads M1–M3 that are arranged in an array in the X direction.

Each sewing head M1 to M3 includes a sewing-head arm 503 which supports, at a free or front end thereof, a needle-bar housing 507 which accommodates twelve needle bars (not shown) arranged in an array in the X direction and twelve thread take-up levers 509 associated with the respective needle bars. The needle-bar housing 507 is displaceable, on the sewing-head arm 503, horizontally in the X direction, so that one of the twelve needle bars may be selected and brought into a sewing position where the selected needle bar is vertically reciprocateable and the thread take-up lever 509 associated therewith is vertically swingable, each in synchronism with the rotation of an upper drive shaft (not shown) extending in the sewing-head arm 503. The sewing position is aligned with a needle throat 512 (FIG. 11) formed in a front end portion of a sewing-bed arm 506 which has a generally cylindrical shape.

The sewing-head arm 503 of each sewing head M1 to M3 extends, like a cantilever, horizontally from an upper end portion of an arm support 504 which extends vertically upward from a machine body or head base 505. The head base 505 is fixed to a top face of the base plate 502. The sewing-bed arm 506 extends from a front face of the head base 505. The sewing-bed arm 506 accommodates, in the front end portion thereof, a thread-loop catcher (not shown) which catches a loop of an upper embroidery thread conveyed by a sewing needle 508 secured to a lower end of a selected needle bar which is currently indexed at the sewing position of the sewing head M1 to M3. The loop catcher is rotated by a lower drive shaft (not shown) extending in the sewing-bed arm 506.

As shown in FIG. 10, a sewing needle 508 is secured to each of the twelve needle bars of each sewing head M1 to M3, and the twelve sewing needles 508 are respectively supplied with twelve color-different embroidery threads from twelve spool holder pins 511 fixed to a spool holder base 510. A desired one of the twelve different threads is selected by displacing the corresponding needle bar and needle 508 to the sewing position, and stitches are formed with the selected color thread on the cap 700 held by the cap holding device 520, by cooperation of the selected needle 508 and the loop catcher provided in the sewing-bed arm 506. The above-mentioned upper and lower drive shafts are operatively connected to a common drive shaft 518, which is connected via a V belt 517 to a main motor (not shown) and is rotated by the main motor. The needle-bar housing 507 of each sewing head M1 to M3 is displaced by an exclusive motor (not shown) independent of the main motor.

In front of the base plate 502, there is disposed a working table 513 which is moved upward and downward. On right and left sides of the working table 513, there are provided two side tables 514, 515. When the working table 513 is moved up to its upper position, the upper surface of the table 513 becomes level with respective upper surfaces of the two side tables 514, 515 and an upper surface of the sewing-bed arm 506. An X-Y movable frame 516 extends over the right and left side tables 514, 515 in the X direction. The X-Y movable frame 516 includes a right frame portion 516a which is driven or moved by an X-direction feeding device in the X direction. A Y-feed member 528 (FIG. 11) is disposed under, and engaged with, a rear frame portion 16c of the X-Y movable frame 516, and is driven or moved by a Y-direction feeding device only in the Y direction, so that the X-Y movable frame 516 engaged with the Y-feed member 528 is moved in the Y direction. Thus, the X-Y movable frame 516 is movable about the tables 513 to 515 by the X-direction and Y-direction feeding devices in the horizontal plane defined by the X and Y directions. The X-Y movable frame 516 additionally includes a left frame portion 516b.

Next, there will be described the construction of the cap holding device 520 that is detachably securable to the head base 505 of each sewing head M1 to M3 of the embroidering machine SM.

The cap holding device 520 permits each sewing head M1 to M3 to form an embroidery on each of a frontal portion and a right and a left temporal portion of the cap 700, and has various structural features for supporting this function.

As shown in FIGS. 11 to 14, the cap holding device 520 includes a cylindrical guide bar 521 which extends in the Y direction in a state in which the guide bar 521 is secured to the head base 505 of each sewing head M1 to M3; a base structure 530 which is supported by the guide bar 521 such that the base structure 530 can be guided, i.e., movable in the Y direction; an inhibiting mechanism 524 which inhibits the base structure 530 from rotating around the guide bar 521; a rotatable structure 540 which is supported by the base structure 530 such that the rotatable structure 540 is rotatable about an axis line parallel to the Y direction (i.e., parallel to the guide bar 521) and such that the rotatable structure 540 is movable with the base structure 530 relative to the head base 505 in the Y direction; the cap holder 580 which holds the cap 700 on which the sewing head M1 to M3 of the embroidering machine SM forms embroidery stitches and which is detachably securable to the rotatable structure 540; a converting mechanism 550 which converts the X-direction movement of the X-Y movable frame 516 into the rotation of the rotatable structure 540 and the cap holder 580 about the above mentioned axis line; and a connecting device 560 which operatively connects the base structure 530 to the Y-feed member 528 that is engaged with a lower portion of the rear frame portion 516c of the X-Y movable frame 516 and which accordingly is movable with the frame 516 in the Y direction by the Y-direction feeding device. The Y-feed member 528 cannot, however, be moved in the X direction even when the X-Y movable frame 516 is moved in the X direction.

The cap 700 is held by the cap holder 580, while the cap holder 580 is rotatably supported by, e.g., the cap-holder supporting apparatus 1 shown in FIG. 1.

Each of the above-indicated elements 521, 530, 524, 540, 550, 560, and 580 is described in detail below.

Figure 13:
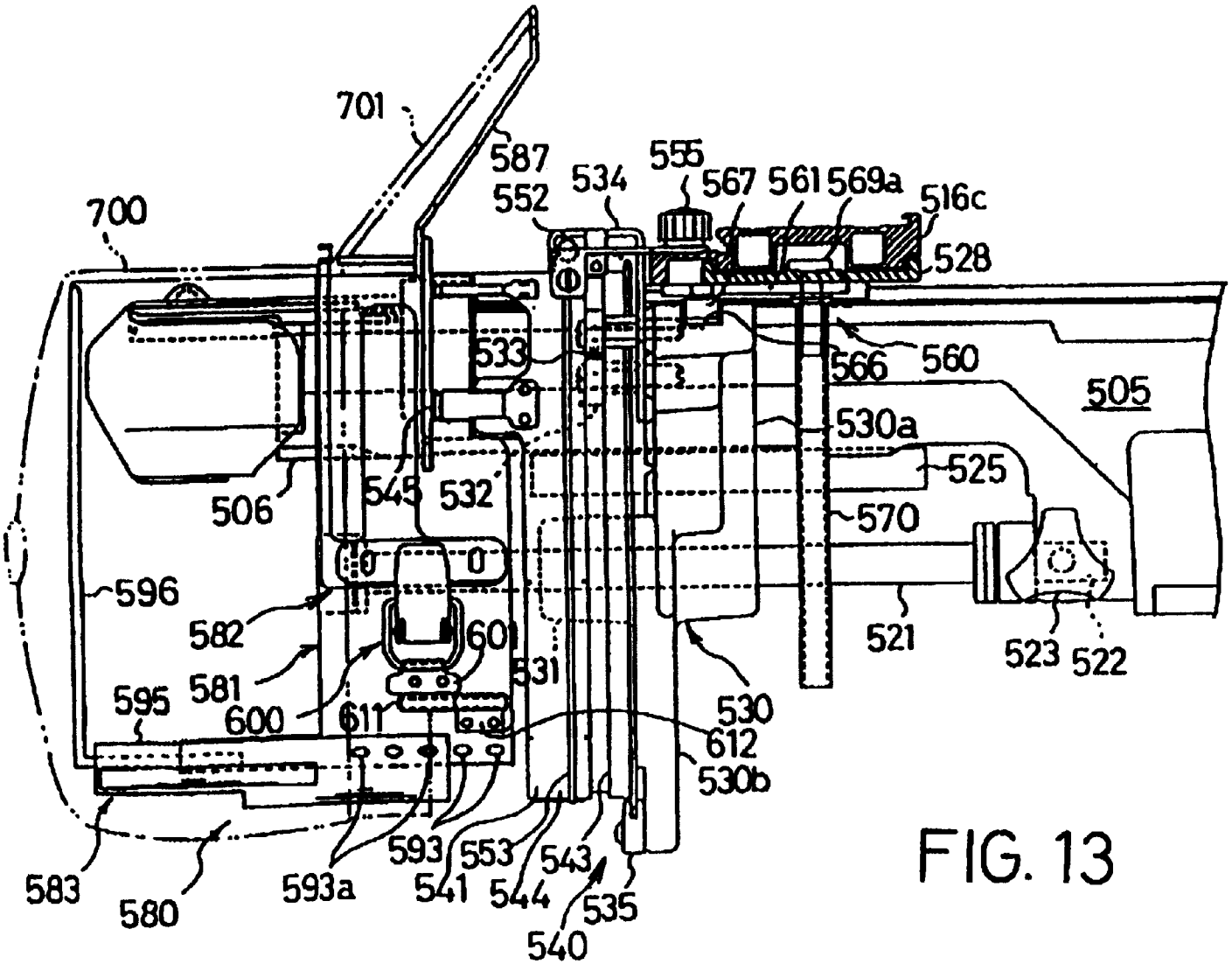
FIG. 13 is a lateral elevation view of the cap holding device of FIG. 11.

As shown in FIG. 13, the guide bar 521 is detachably securable to the front face of the head base 505 of each sewing head M1 to M3, in such a manner that the guide bar 521 is inserted rearward into an insertion hole 522 which is formed in the head base 505 so as to extend horizontally in the Y direction. The insertion of the guide bar 521 is stopped by abutment on an innermost wall defining the bottom of the insertion hole 522. The insertion hole 522 has a diameter substantially equal to an outer diameter of the cylindrical guide bar 521. The guide bar 521 inserted in the insertion hole 522 is fastened by a fastening member 523 such as a screw having a knob. Thus, the guide bar 521 is detachably secured to the head base 505 of the sewing head M1 to M3.

As shown in FIG. 13, the base structure 530 includes, in a central portion thereof, a fitting sleeve 531 which is externally fitable on the cylindrical guide bar 521 such that the sleeve 531 is slideable or movable on the guide bar 5.21 in the Y direction. The fitting sleeve 531 has an inner diameter substantially equal to the outer diameter of the cylindrical guide bar 521.

Figure 14:
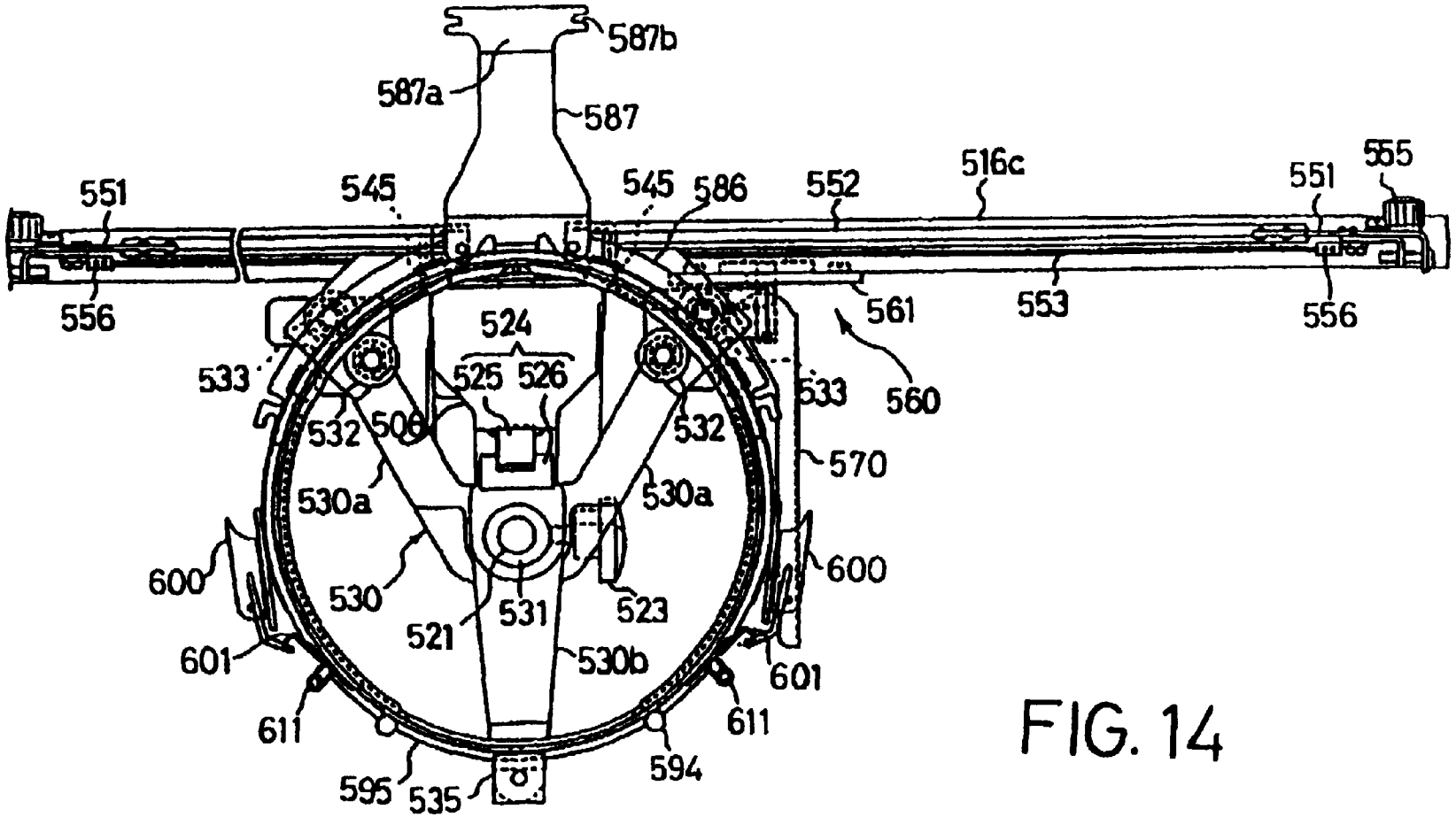
FIG. 14 is a front elevation view of the cap holding device of FIG. 11.

As shown in FIG. 14, the base structure 530 further includes a Y-shaped frame which is fixed at a central portion thereof to the fitting sleeve 531. The y-shaped frame includes two upper arms 530a, 530a each of which supports at a free end portion thereof a pair of support rollers 532, 533 which cooperate with each other to externally and internally support the rotatable structure 540 such that the rotatable structure 540 is rotatable about an axis line parallel to the Y direction. The two pairs of support rollers 532, 533 of the base structure 530 cooperate with each other to rotatably support the rotatable structure 540. The Y-shaped frame additionally includes a lower arm 530b.

The outer roller 533 of each pair of support rollers 532, 533 is concentrically and rotatably supported by one end of an eccentric axis member which is concentrically fixed at the other end thereof to a rotatable member rotatably supported by the corresponding arm 530a, so that the outer roller 533 may be re-positioned relative to the corresponding inner roller 532 in a direction perpendicular to the Y direction by rotating the rotatable member supporting the eccentric axis member. The rotatable member supporting the eccentric axis member may be adjusted to any angular position, or by any rotation amount, relative to the corresponding arm 530a. The position of the outer roller 533 relative to the inner roller 532 may finely be adjusted in a direction perpendicular to the Y direction, by loosening a fastening member such as a nut for fastening the rotatable member, rotating the rotatable member (and the eccentric axis member) by an appropriate angular amount, and fastening the rotatable member with the nut. This fine adjustment of the outer roller 533 assures that the outer roller 533 cooperates with the inner roller 532 to support the rotatable structure 540 in an optimum manner in which a front portion of the cap 700 held by the cap holder 580 is positioned at an optimum level with respect to the sewing-bed arm 506, even if the holder 580 may be changed with another holder 580 having a slightly different radius of curvature.

The inner roller 532 of each pair of support rollers 532, 533 may, or may not, be supported by an eccentric axis member similar to the eccentric axis member of the outer roller 533. Two fixtures 534 are fixed to the two arms 530a, respectively, each via the axis members of a corresponding pair of support rollers 532, 533. Each fixture 534 has a generally L-shaped cross section as viewed in FIG. 13.

As shown in FIG. 14, the inhibit mechanism 524 includes a key member 525 which is fixed to a bottom face of the sewing-bed arm 506 and extends in the Y direction. The inhibit mechanism 524 additionally includes a grooved member 526 which is fixed to a top face of the central portion of the Y-shaped frame of the base structure 530 and which has a groove engageable with the key member 525 when the guide bar 521 and the base structure 530 fitting on the guide bar 521 are secured to the head base 505 of the sewing head M1 to M3. The grooved member 526 engaged with the key member 525 is slideable or movable relative to the key member 525, so that the engaged key and grooved members 525, 526 permit the base structure 530 to be guided on the guide bar 521 in the Y direction but do not permit the base structure 530 so rotate around the guide bar 521 extending in the Y direction. However, the key member 525 may be fixed to the base structure 530 and the grooved member 526 may be fixed to the sewing-bed arm 506.

Figure 11:
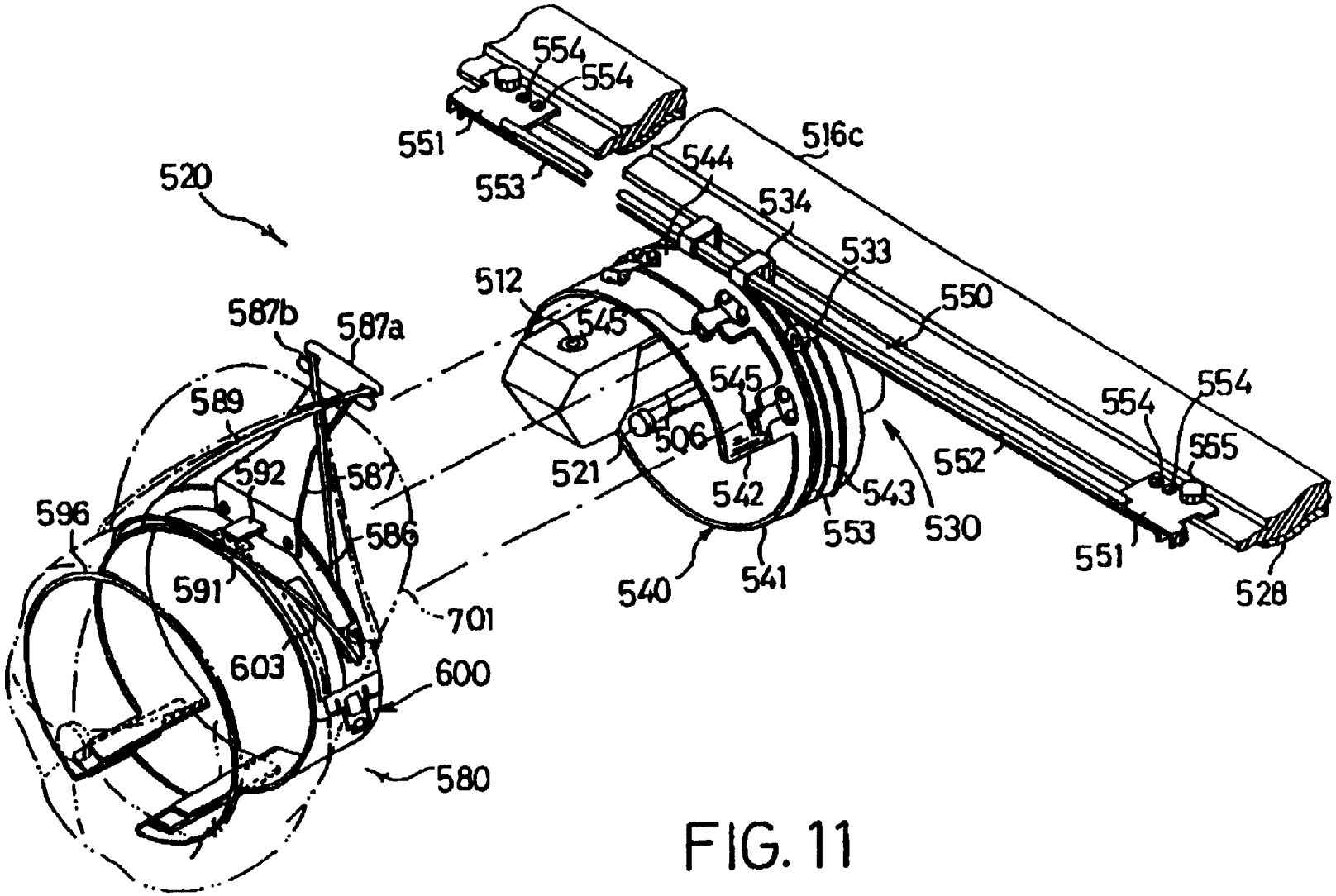
FIG. 11 is a perspective view of the cap holding device including the cap holder embodying the present invention.

As shown in FIG. 11, the rotatable structure 540 includes a cylindrical portion 541 having a circular cross-section shape, and a cap-holder support portion 542 which extends frontward over a predetermined length from an upper half portion of the cylindrical portion 541 and has a semi-circular cross-section shape. The cylindrical portion 541 has, in an outer circumferential surface thereof, a roller guide groove 543 in which the outer rollers 533 of the two pairs of support rollers 532, 533 fit, and a wire guide groove 544 which receives a single connection wire 553 of the converting mechanism 550. A lower end portion of the cylindrical portion 541 is engaged with, and guided by, a guide portion 535 (FIG. 14) of the lower arm 530b of the base structure 530 such that the cylindrical portion 541 is slideable and movable relative to the base structure 530.

Four securing rollers 545 are fixed to the outer surface of the cylindrical portion 541 via respective spring members.

The cap holder 580 is detachably securable to the rotatable structure 540 such that an engaging portion 584 (FIG. 8) of the cap holder 580 externally fits on the support portion 542 of the cylindrical portion 541 against the elastic biasing forces of the spring members associated with the securing rollers 545. The securing rollers 545 are held in engagement with securing holes 588 formed through the thickness of the engaging portion 584 of the cap holder 580.

As shown in FIG. 11, the converting mechanism 550 includes a pair of right and left end plates 551, 551 which are detachably securable to an upper surface of the rear frame portion 516c on the X-Y movable frame 16, with a predetermined distance being provided between the two end plates 551 secured to the rear frame portion 516c. Each end plate 551 is secured to the rear frame portion 516c, with the help of two vises 554 and a vise 555 with a knob. The converting mechanism 550 additionally includes a connecting rod 552 which connects the two end plates 551, and the single connection wire 553.

As shown in FIG. 13, the connection wire 553 is connected at a left end thereof to a metal member 556 fixed to the left end plate 551, is wound one full turn along the wire guide groove 544 of the rotatable structure 540, in a clockwise direction, and is connected at a right end thereof to a metal member 556 fixed to the right end plate 551. The connection wire 553 may be fixed, at an intermediate portion thereof, to a lower portion of the rotatable structure 540.

When the X-Y movable frame 516 or the rear frame portion 516c is moved leftward in the X direction by the X-direction feeding device, the Y-feed member 528 cannot be moved in the X direction, but the rotatable structure 540 is rotatable over about 140 degrees from its neutral position, about the center line of the cylindrical portion 541, in a counterclockwise direction as viewed in FIG. 14. Meanwhile, the rotatable structure 540 is rotatable over about 140 degrees from the neutral position, in a clockwise direction, when the X-Y movable frame 516 is moved rightward in the X direction. The angular amount of rotation of the rotatable structure 540 is directly proportional to the amount of the rightward or leftward movement of the X-Y movable frame 516 in the X direction.

Figure 12:
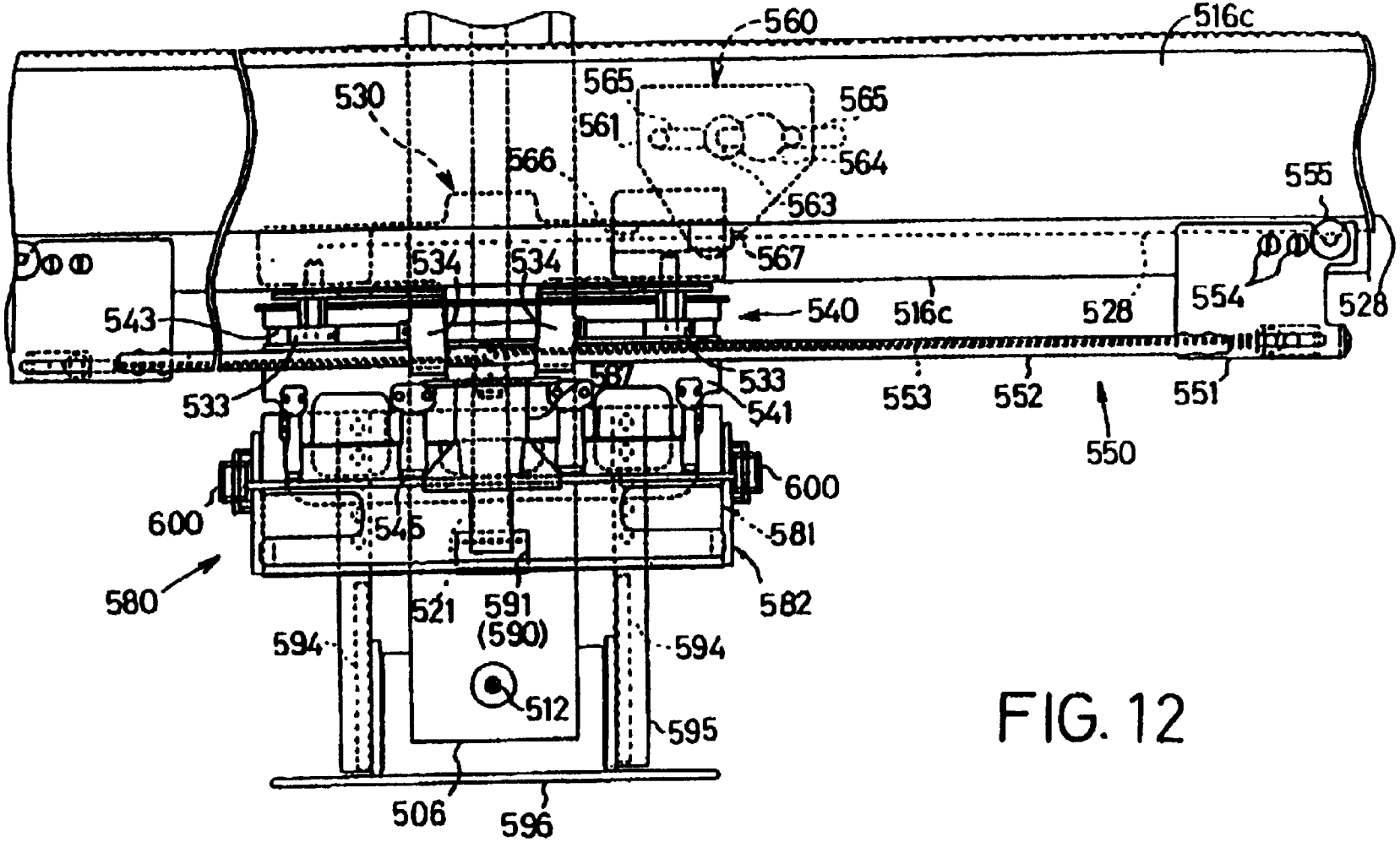
FIG. 12 is a plan view of the cap holding device of FIG. 11.
Figure 15:
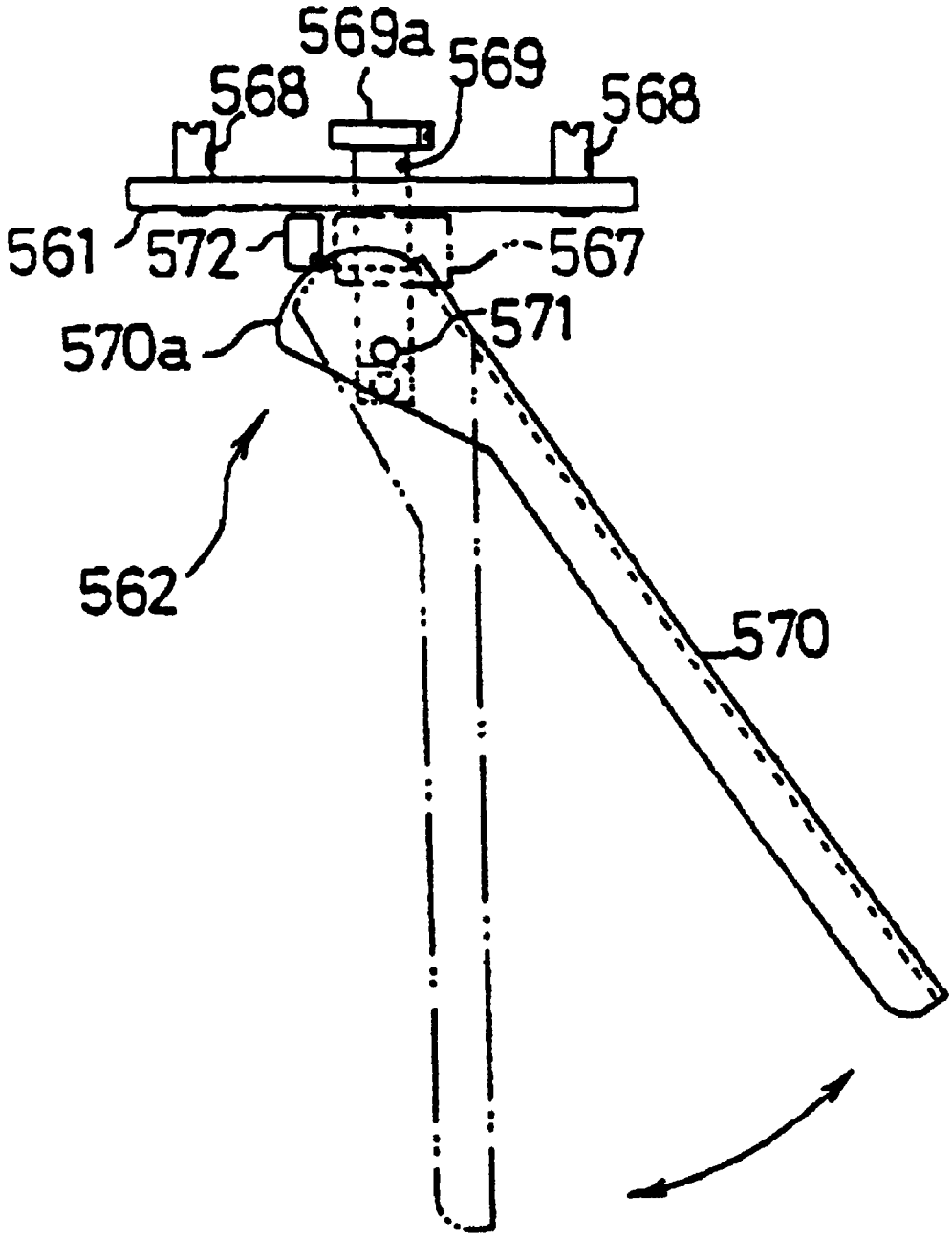
FIG. 15 is a front elevation view of a connecting device of the cap holding device of FIG. 11.

As shown in FIGS. 12, 13, and 15, the connecting device 560 includes a connection member 561 which is engageable with the base structure 530 to operatively connect the base structure 530 to the Y-feed member 528; and a clamping mechanism 562 which is associated with the connection member 561 and is manually operable for clamping the connection member 561 to, and releasing the same 561 from, the Y-feed member 528. With the cap holding device 520 being secured to the head base 505 of the sewing head M1 to M3, the connection member 528 is positioned above the base structure 530 and below the Y-feed member 528, as shown in FIG. 13.

As shown in FIG. 12, the Y-feed member 528 has an engagement region which is engageable with the connection member 561. The engagement region includes a circular hole 564, a narrow elongate hole 563 which communicates with a left end of the circular hole 564 and extends in the X direction, and a pair of elongate slits 565, 565 which are provided on both sides of the circular and elongate holes 564, 563 and each of which extends in the X direction.

As shown in FIG. 13, a slide member 567 is secured to a front end portion of a lower surface of the connection member 561. The slide member 567 is engageable with an engagement groove 566 which is formed in a top face of the right arm 530a of the base structure 530 and extends in the X direction. Additionally, a pair of right and left positioning pins 568, 568 (FIG. 15) are fixed to an upper surface of the connection member 561. The two pins 568 are engageable with the two elongate holes 565 of the Y-feed member 528, respectively.

The clamping mechanism 562 associated with the connection member 561 is shown in FIG. 15. The clamping mechanism 562 includes a second connection member or axial member 569 which has a head portion 569a engageable with the elongate hole 563 of the Y-feed member 528 and additionally has an axial portion extending downward from the head portion 569a. The clamping mechanism 562 further includes a head lever 570 which is pivoted to a lower end portion of the axial portion of the axial member 569 with a pin 571 extending in the Y direction. The hand lever 570 is pivotable about the pin 571 for selectively moving the axial member 569 to one of a clamping position where the head portion 569a of the axial member 569 engages the engagement region of the Y-feed member 528 so that the first connection member 561 is held in engagement with the Y-feed member 528, and a releasing position where the head portion 569 is kept away upward from the clamping position.

As shown in FIG. 15, the hand lever 570 has a curved top end. The clamping and releasing positions of the axial member 569, i.e., clamping mechanism 562 are indicated at two-dot chain line and solid line, respectively.

The first connection member 561 is detachably secured to the Y-feed member 528 by operating the clamping mechanism 562, specifically, hand level 570, in such manner that with the axial member 569 being held in the releasing position, the head portion 569a of the axial member 569 and the positioning pins 568 of the connection member 561 are inserted into the circular hole 564 and the elongate slits 565 of the Y-feed member 528, respectively, subsequently the slide member 567 of the connection member 561 is moved leftward in the engagement groove 566 of the right arm 530a of the base structure 530, so as to bring the axial portion of the axial member 569 into engagement with the elongate hole 563, and then the head portion 569a of the axial member 569 is moved downward to, and held in, the clamping position.

Next, there will be described the construction of the cap holder 580.

As shown in FIGS. 11 to 17, the cap holder 580 includes a generally cylindrical main frame member 581 which is detachably attached to the rotatable structure 540. The cap holder 580 additionally includes a pressing frame member 582 which is externally and unfastenably fastened to the main frame member 581 with the cap 700 being held therebetween. Moreover, the cap holder 580 includes a cap-shape keeping member 583.

The main frame member 581 includes a rear half portion providing the engaging portion 584 which externally fits on the support portion 542 of the rotatable structure 540 and which has an arcuate cross-section shape extending over more than 300 degrees about the center line of rotation of the rotatable structure 540, as shown in FIG. 11. A front half portion of the main frame member 581 provides an arcuate cap-holding portion 585 which is integral with the engaging portion 584 and which also has an arcuate cross-section shape extending over more than 300 degrees. A partial flange 586 is fixed to the engaging portion 584, and a cap-visor support member 587 for supporting the visor 701 of the cap 700 is fixed to a middle, top portion of the partial flange 586 such that the support member 587 projects obliquely upward and rearward. The engaging portion 584 has the four securing holes 588 which are engageable with the four securing rollers 545 of the rotatable structure 540, respectively. With the securing holes 588 being engaged with the securing rollers 545, the cap holder 580 is detachably attached to the rotatable structure 540.

Figure 16:
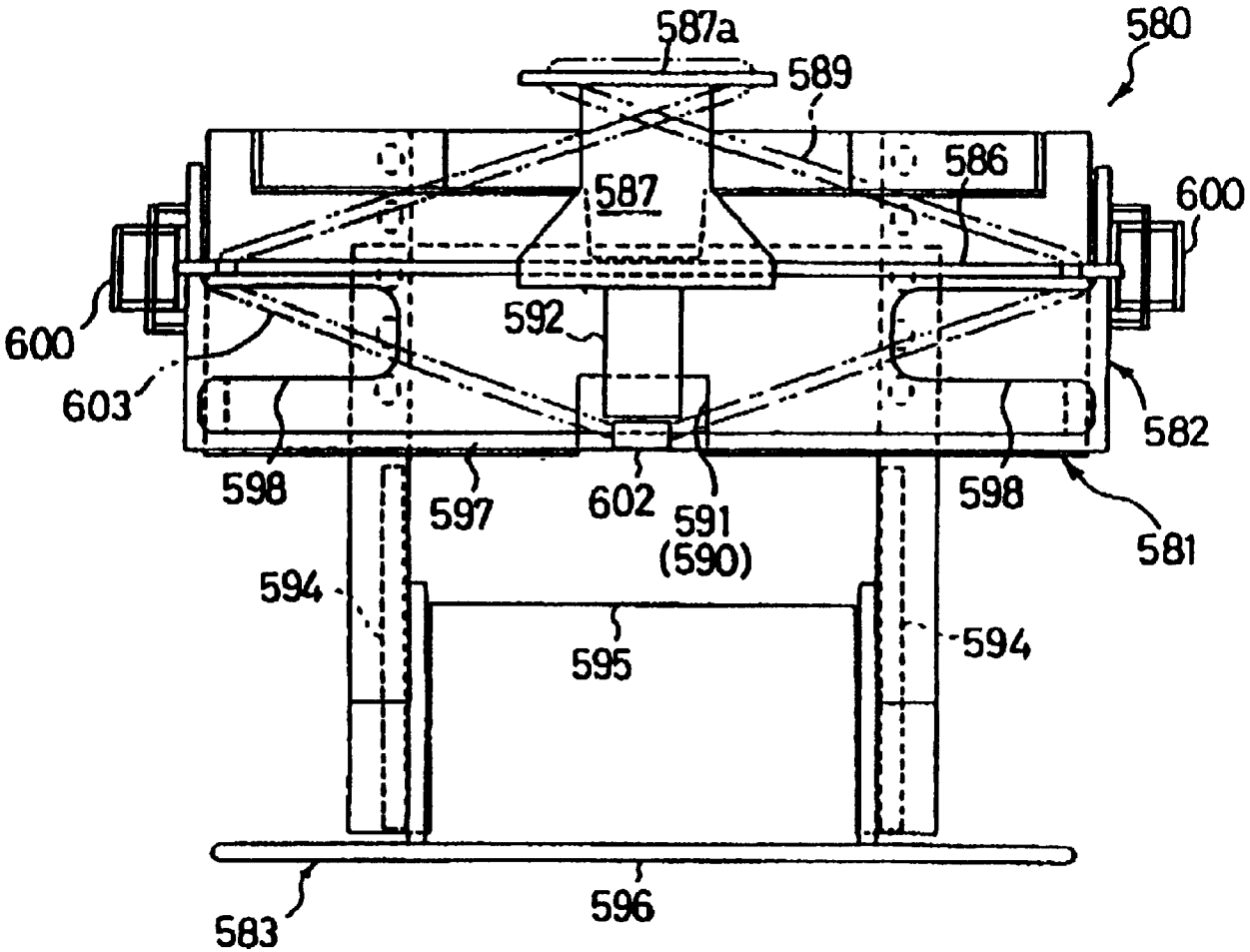
FIG. 16 is a plan view of the cap holder of FIG. 11.

As shown in FIGS. 11 and 16, the cap-holding portion 585 of the main frame member 581 has a recess 591 which is formed through the thickness of a top portion thereof and opens in a front end of the cap-holding portion 585. Under the pressing frame member 582 fastened to the main frame member 581, a cloth-based, soft, frontal portion of the cap 700 is so deformed as to engage the recess 591. Thus, the recess 591 functions as an engaging portion 590 for engaging the cap 700. The recess 591 has a dimension of about 30 mm in the X direction and a dimension of about 15 mm in the Y direction. The cap-visor support member 587 has a pair of right and left recesses 587b formed in a top end portion 587a thereof. A first elastic cord 589 is engaged with the two recesses 578 for biasing the visor 701 of the cap 700 in a rearward direction and preventing the cap 700 from being moved relative to the visor-support member 587. Each of opposite end portions of the first cord 589 is connected to one recess of a corresponding one pair of recesses out of two pairs of recesses of the partial flange 586. A stopper member 592 which also functions as another visor-support member is fixed to a front face of a bottom portion of the visor support member 587, for supporting a middle portion of a base portion of the visor 701, thereby stopping a rearward movement of the visor 701.

The shape-keeping member 583 for keeping the shape of the cap 700 held by the cap holder 580 (in particular, the shapes of frontal and right and left temporal portions of the cap) is secured to two lower end portions of the main frame member 581, with the help of vise holes 593 and vises 593a, such that the position of the shape-keeping member 583 relative to the main frame member 581 in the Y direction is changeable or adjustable by selecting an appropriate one or ones of the vise holes 593 for being used with the vises 593a. The shape-keeping member 583 includes a bridge member 595, an arcuate member 596, and a pair of right and left clipping rods 594. The bridge member 595 that are fixed to the main frame member 581 with the help of vises 593a, bridges the two lower end portions of the main frame member 581. The bridge member 595 is provided by a curved plate. The arcuate member 596 has an arcuate cross-section shape extending over about 300 degrees, and extends upward from two front end portions of the bridge member 595. The clipping rods 594 are fixed to a lower surface of the bridge member 595 to support the arcuate member 596. The pressing frame member 582 will be described below.

As shown in FIGS. 11 to 17, the pressing frame member 582 is formed of a thin, flexible steel plate, and externally and detachably fits on the cap-holding portion 585 of the main frame member 581 with the cap 700 being held therebetween. The pressing frame member 582 may be formed of a resin or a hard rubber.

The pressing frame member 582 includes a pressing frame portion 597 with a small width, and a pair of right and left pressing strips 598. The pressing frame portion 597 extends along the base portion of the visor 701 of the cap 700, and presses the frontal portion of the cap 700 and respective front-side half portions of the right and left temporal portions of the cap 700, against the main frame member 581. The two pressing strips 598 press, against the main frame member 581, a sweatband or a sweat absorbing member 702 of the cap 700 being unfolded and kept outside.

A hook member 602 having a U-shaped cross section is fixed to a top, middle portion of the pressing frame portion 597 such that the hook member 602 is opposed to the stopper member 592. A middle portion of a second elastic cord 603 is engaged with the hook member 602, and each of opposite end portions of the second cord 603 is connectable to the other recess of a corresponding one pair of recess out of the two pairs of recess of the partial flange 586.

Opposite end portions of the pressing frame member 582 provide two connecting metal portions 599, and two connecting metal members 600 are fixed to the two connecting portions 599, respectively. Each connecting portion 599 has a length substantially equal to the Y-direction dimension of the main frame member 581. Each connecting member 600 is engageable with, and disengageable from, a corresponding one of two hook members 601 fixed to the cap-holding portion 585 of the main frame member 581. In the present embodiment, the connecting members 600 provide first engageable members, the hook members 601 provide second engageable members, and the connecting members 600 and the hook members 601 cooperate with each other to provide two fastening devices for fastening the pressing frame member 582 around the main frame member 581, thereby holding the cap 700 between the pressing frame member 582 and the main frame member 581.

Next, the connecting metal portions 599 and the connecting metal members 600 will be described, only with respect to the right ones 599, 600, because the two portions 599 or the two members 600 have an identical structure.

Figure 18:
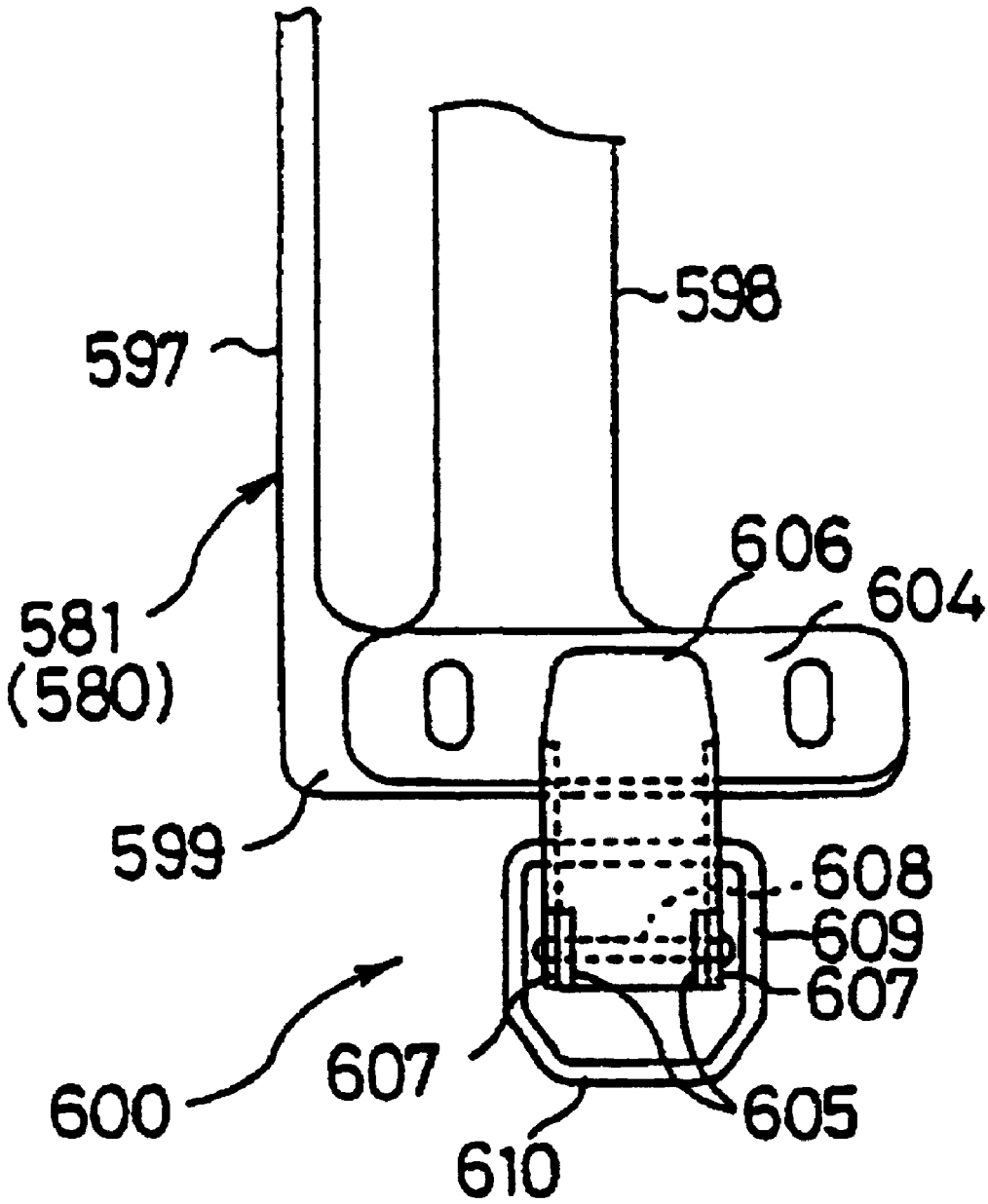
FIG. 18 is a lateral elevation view of a fastening device of the cap holder of FIG. 11.
Figure 19:
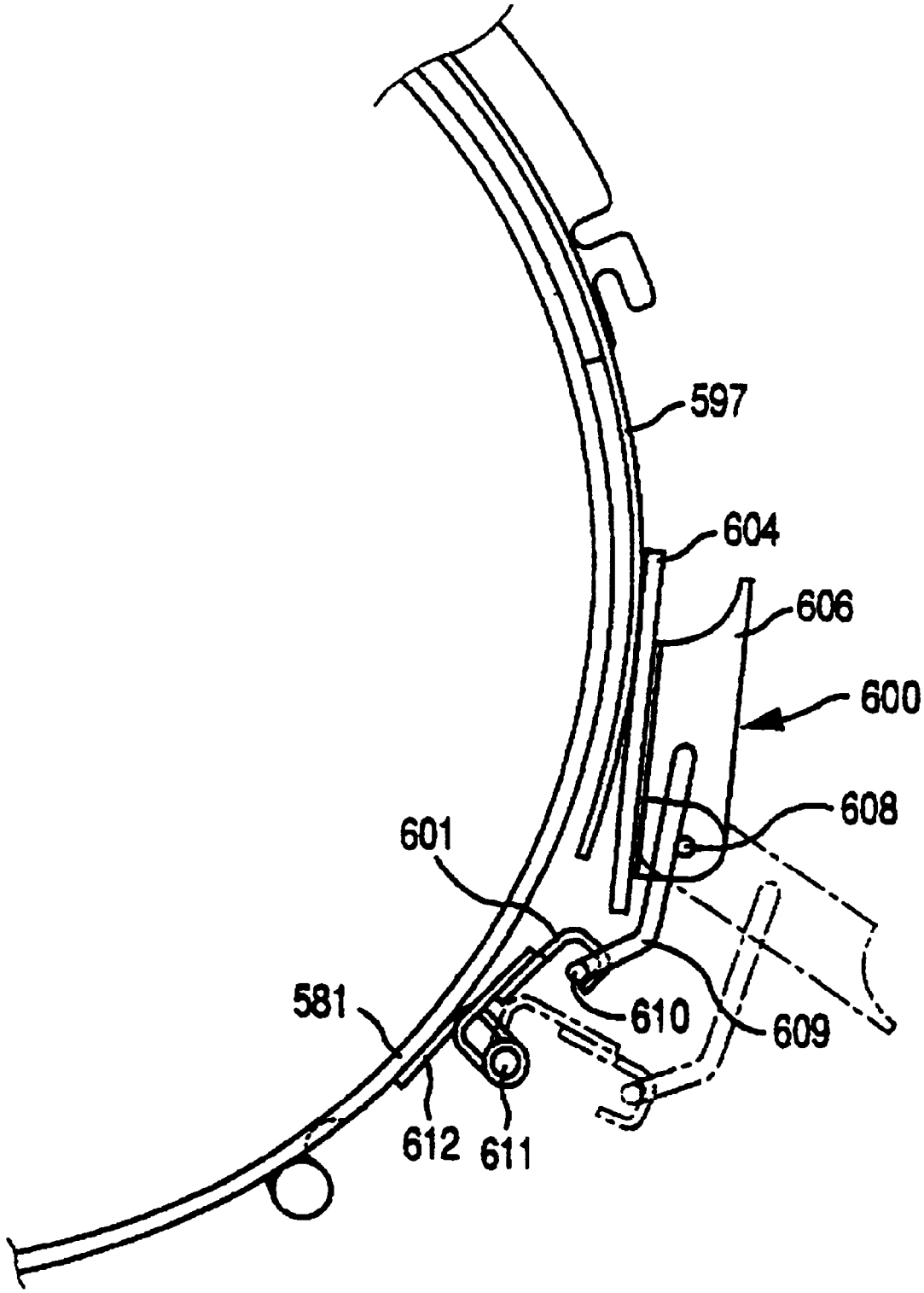
FIG. 19 is an enlarged, front elevation view of a part of the cap holder of FIG. 11.

As shown in FIGS. 18 and 19, a T-shaped base plate 604 is welded to the connecting portions 599. A pair of brackets 605 are provided by cutting and bending an end portion of the base plate 604, and a pair of support members 607 are externally fixed to the two brackets 605, respectively. A manually operable lever 606 is supported by the pair of brackets 605 and the pair of support members 607 via an axis pin 608 such that the lever 606 is rotatable about the pin 608.

The connecting member 600 includes a generally rectangular doughnut-like rink 609 which is supported by an intermediate portion of the lever 606 such that the rink 609 is rotatable relative to the lever 606. The rink 609 includes an engagement portion 610 which is engageable with the hook member 601. As indicated at two-dot chain line in FIG. 19, when the lever 606 is manually moved downward, the connecting member 600 is disengaged from the hook member 601, so that the pressing frame member 682 does not any longer press the cap 70 against the main frame member 581. As indicated at solid line in FIG. 19, where the lever 606 is pulled upward after the engagement portion 610 is engaged with the hook member 601, the connecting member 600 fastens the pressing frame member 582 around the main frame member 581, thereby retaining the cap 700 between the two members 582, 581. The engagement portion 610 includes two bent side portions functioning as a spring which elastically deforms to permit the lever 606 to be moved over a dead center thereof when the lever 606 is manually rotated by the operator in a counterclockwise direction about the pin 608.

Figure 17:
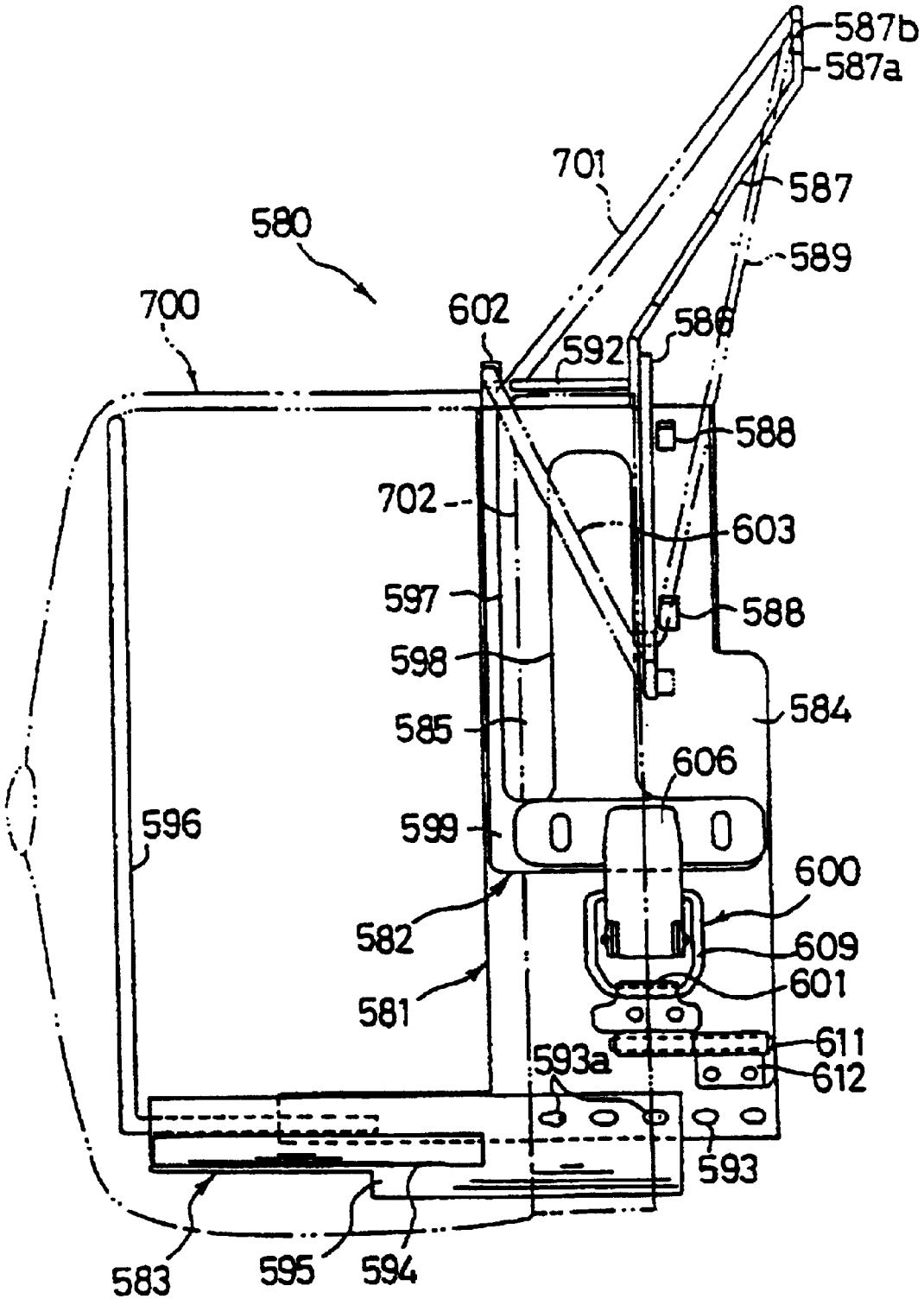
FIG. 17 is a lateral elevation view of the cap holder of FIG. 11.

As shown in FIGS. 17 and 19, the hook member 601 is supported by an axis member 611, such that the hook member 601 is rotatable about an axis line of the axis member 611. The axis member 611 is supported by a plate member 612 fixed to the main frame member 581. When the connecting member 600 is not in engagement with the hook member 601, a space is left between the hook member 601 or the axis member 611 and the outer circumferential surface of the main frame member 581. Thus, the operator can easily insert a temporal portion of the sweat absorbing member 702 unfolded outside, into this space, without being interfered with by the connecting member 600, the hook member 601, or the axis member 611. When the levers 606 are pulled up to fasten the pressing frame member 582 to the main frame member 581, the hook members 601 engage the sweat absorbing member 702, thereby drawing outer portions of the absorbing member 702 downward along the outer circumferential surface of the main frame member 581. Thus, the cap 700 is fully stretched on the main frame member 581.

Next, there will be described the manner in which the cap holder 580 is used.

A cap 700 is set on the cap holder 580 which is supported by, e.g., the cap-holder supporting apparatus 1 shown in FIG. 1. First, after the pressing frame member 582 is unfastened from the main frame member 581, the cap holder 580 is secured to the supporting apparatus 1, and the cap 700 with the sweat absorbing member 702 unfold outside is set on the main frame member 581, by being moved in the rearward direction, such that the sweat absorbing member 702 is inserted into the space provided between the hook members 601 and the main frame member 581. Next, the pressing frame member 582 is externally put on the cap 700, so that the cap 700 is pinched between the pressing frame member 582 and the cap-holding portion 585 of the main frame member 581. In this state, the operator can minutely adjust or correct the position and shape of the cap 700 being held on the cap holder 589 and the positions of the pressing frame portion 597 and the pressing strips 598, and fasten the right and left connecting members 600 of the pressing frame member 582 so the right and left hook members 601 of the main frame member 581, respectively. Owing to the arcuate member 596 of the shape-keeping member 583, the frontal and right and left temporal portions of the cap 700 are fully stretched on the cap holder 580, as shown in FIG. 17.

In the case where an embroidery area of the cap 700 including the frontal and temporal portions of the cap 700 is not stretched to a sufficiently high degree in a circumferential direction of the annular portion 705 of the cap 700, the degree of stretching of the left-hand half of the embroidery area may be adjusted by unfastening the left connecting member 600 and drawing the cloth material of the cap 700 in a leftward and downward direction along the circumference of the main frame member 581, and subsequently the degree of stretching of the right-hand half of the embroidery area may be adjusted by unfastening the right connecting member 600 and drawing the cloth material of the cap 700 in a rightward and downward direction along the circumference of the main frame member 581.

Subsequently, the cap holder 580 on which the cap 700 is held is detachably attached to the rotatable structure 540 of the cap holding device 520 secured to the sewing head M1 to M3 of the embroidering machine SM, so that an embroidery is formed on each of the front portion of the cap 700, and on the right and/or left temporal portions of the cap 700, as needed. After the embroidering operation, the cap holder 580 holding the cap 700 is detached from the rotatable structure 540.

Figure 20:
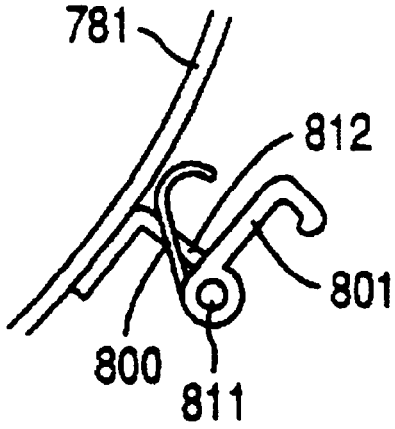
FIG. 20 is a view corresponding to FIG. 19, showing one of fastening devices of another cap holder as another embodiment of the present invention.

FIG. 20 shows another embodiment of the cap holder in accordance with the present invention, in which a spring member 800 is fixed to each of the respective hook members 801 of two fastening devices. The hook member 801 does not have, unlike the hook member 601, any portion which is moved toward a main frame member 781 and away from a pressing frame member (not shown) when the corresponding fastening device fastens the pressing frame member to the main frame member 781. However, in the present embodiment, each fastening device includes the spring member 800. When each fastening device fastens the pressing frame member to the main frame member 781 after a cap 700 is set on the main frame member 781, the hook member 801 is rotated about an axis line of a support axis member 811 and accordingly the spring member 800 is rotated with the hook member 801, so that the spring member 800 engages the cap 700 and elastically presses the cap 700 against an outer circumferential surface of the main frame member 781. Thus, the cap 700 is fully secured onto the main frame member 781, and each sewing head M1 to M3 can form an excellent embroidery on each of a frontal portion and a right and/or left temporal portion of the cap 700.

Figure 21:
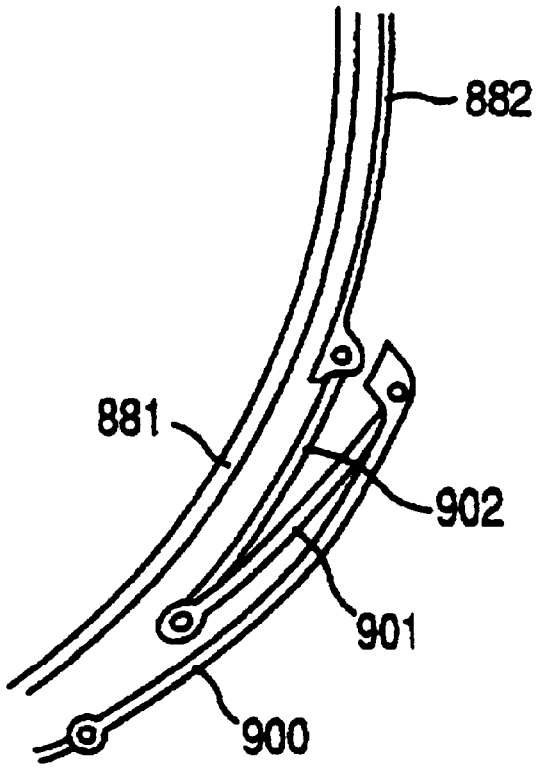
FIG. 21 is a view corresponding to FIG. 19, showing one of fastening devices of yet another cap holder as yet another embodiment of the present invention.

In the embodiment shown in FIG. 11, the fastening devices are provided by the connecting members 600 and the hook members 501 which are engageable and disengageable with and from each other. However, as shown in FIG. 21, each fastening device may be provided by a main-frame-member-side (first) member 900, an intermediate (second) member 901, a pressing-frame-member-side (third) member 902. The second member 901 is hinged, at one end thereof, with the first member 900 and is hinged, at the other end thereof, with the third member 902. The first member 900 is rotatably connected to a support member connected to a main frame member 881, and the third member 902 is rotatably connected to a pressing frame member 882. In the latter case, each fastening device may selectively be placed in a fastening state in which one end of the first member 900 connected to the second member 901 engages, by snap action, one end of the pressing frame member 882 to which the third member 902 is connected, and a unfastening state in which the first member 900 is disengaged from the pressing frame member 882. While each fastening device is placed in the unfastening state, the three members 900, 901, 902 can be extended by the sum of respective lengths of the second and third members 901, 902, so that a cap 700 can easily be inserted into a space which is created between the main frame member 881 and the pressing frame member 882. On the other hand, while each fastening device is placed in the fastening state, the three members 900, 901, 902 securely retain the cap 700 on the main frame member 881 against the restoring force of the cloth material of the cap 700 being pressed and deformed under the pressing frame member 882.

It is to be understood that the present invention may be embodied with other changes, improvements, and modifications that may occur to those skilled in the art without departing from the scope and spirit of the invention defined in the appended claims.

What is claimed is:

1. A headgear holder for use with a sewing machine, the headgear holder holding a headgear including a covering member which has an opening and covers the head of a person through the opening, and a sweatband which is fixed at a portion thereof to an inner surface of an annular portion of the covering member located on the side of the opening, the sweatband being foldable into an inner space of the covering member and unfoldable outside from the inner space through the opening, the sewing machine forming an embroidery on each of a frontal portion, and at least one of a right and a left temporal portion, of the annular portion, the headgear holder comprising:

a main frame member on which the headgear is set such that the sweatband unfolded outside and the annular portion of the covering member externally fit on said main frame member;

a pressing member which externally presses the headgear set on said main frame member; and two fastening devices one of which is provided between said main frame member and a corresponding one of opposite ends of said pressing member and the other of which is provided between the main frame member and the other end of the pressing member, said two fastening devices cooperating with each other to fasten the pressing member to the main frame member to hold the headgear between the pressing member and the main frame member, each of said fastening devices being provided at a position where said each fastening device permits the sweatband unfolded outside to fit externally on the main frame member,

*wherein said each fastening device includes a support member, and*

*wherein a space is provided between said support member and an outer surface of the main frame member, the sweatband unfolded outside being inserted into said space and thereby externally fit on the main frame member.*

2. A headgear holder according to claim 1, wherein said each fastening device is selectively placed by a user in a first state in which said each fastening device fastens said pressing member to said main frame member to hold the headgear between the pressing member and the main frame member, and a second state in which said each fastening device unfastens the pressing member from the main frame member.

3. A headgear holder according to claim 2, wherein said each fastening device comprises a manually operable member which is movably supported by one of said pressing member and said main frame member and which is manually movable to fasten the pressing member to the main frame member, and an engageable member which is supported by the other of the pressing member and the main frame member such that said engageable member is engageable with, and disengageable from, said manually operable member and which is engaged with the manually operable member to fasten the pressing member to the main frame member.

4. A headgear holder according to claim 3, wherein said [each fastening device comprises a] support member which supports one of said manually operable member and said engageable member which is supported by said main frame member[, and wherein a space is provided between said support member and an outer surface of the main frame member, the sweatband unfolded outside being inserted into said space and thereby externally fit on the main frame member].

5. A headgear holder according to claim 1, wherein said two fastening devices are provided at two positions corresponding to the right and left temporal portions of the headgear set on said main frame member, respectively.

6. A headgear holder for use with a sewing machine, the headgear holder holding a headgear including a covering member which has an opening and covers the head of a person through the opening, and a sweatband which is fixed at a portion thereof to an inner surface of an annular portion of the covering member located on the side of the opening, the sweatband being foldable into an inner space of the covering member and unfoldable outside from the inner space through the opening, the sewing machine forming an embroidery on a sewing portion of the covering member which corresponds to the sweatband folded inside, the headgear holder comprising:

a main frame member on which the headgear is set such that at least a portion of the sweatband which corresponds to the sewing portion of the covering member is unfolded outside and such that the annular portion of the covering member and the outside unfolded portion of the sweatband externally fit on said main frame member;

a pressing member which presses the outside unfolded portion of the sweatband on said main frame member; and a switching device which is operable for placing said pressing member in a first state in which the pressing member presses the outside unfolded portion of the sweatband on said main frame member and in a second state in which the pressing member does not press the outside unfolded portion of the sweatband on the main frame member*; and*

*two fastening devices one of which is provided between said main frame member and a corresponding one of opposite ends of said pressing member and the other of which is provided between the main frame member and the other end of the pressing member, said two fastening devices cooperating with each other to fasten the pressing member to the main frame member to hold the headgear between the pressing member and the main frame member, each of said fastening devices being provided at a position where said each fastening device permits the sweatband unfolded outside to fit externally on the main frame member,*

*wherein said each fastening device includes a support member, and*

*wherein a space is provided between said support member and an outer surface of the main frame member, the sweatband unfolded outside being inserted into said space and thereby externally fit on the main frame member.*

7. A headgear holder according to claim 6, wherein said pressing member includes a first pressing portion which presses the outside unfolded portion of the sweatband, and a second pressing portion which presses a portion of the covering member which is nearer to the opening than the sewing portion of the covering member.

8. A headgear holder according to claim 7, the headgear additionally including a visor projecting outside from the annular portion thereof, wherein said pressing member has a shape which assures that the pressing member presses both the outside unfolded portion of the sweatband and said portion of the covering member nearer to the opening, on said main frame member, without being interfered with by the visor of the headgear set on the main frame member.

9. A headgear holder according to claim 8, wherein said pressing member includes:

a covering-member pressing portion which extends along, and presses, said portion of the covering member nearer to the opening;

two arm portions which project from opposite ends of said covering-member pressing portion, respectively, in a direction which is substantially perpendicular to a direction of extending of the covering-member pressing portion and is substantially parallel to a direction of outside unfolding of the sweatband through the opening; and two sweatband pressing portions which project from said two arm portions, respectively, toward each other in a direction substantially parallel to said direction of extending of said covering-member pressing portion and which cooperate with each other to press the sweatband on said main frame member.

10. A headgear holder according to claim 9, further comprising:

a first visor-support member which projects from said main frame member and supports a free end portion of the visor of the headgear set on the main frame member; and at least one hook member which is provided on at least one lengthwise intermediate portion of said covering-member pressing portion, a cord being engageable with said first visor-support member and said hook member to press the visor of the headgear against the first visor-support member.

11. A headgear holder according to claim 10, further comprising at least one second visor-support member which is provided on said main frame member and supports a base portion of the visor of the headgear which is remote from the free end portion of the visor.

12. A headgear holder according to claim 11, wherein said second visor-support member is opposed to said hook member, so that the second visor-support member and the hook member cooperate with each other to position the base portion of the visor of the headgear in a direction in which the cord presses the visor against the first visor-support member.

13. A headgear holder according to claim 9, wherein said switching device comprises two fastening devices each of which fastens a corresponding one of said two arm portions of said pressing member to said main frame member, thereby placing the pressing member in said first state in which the pressing member presses the outside unfolded portion of the sweatband on the main frame member, said each fastening device unfastening said corresponding one arm portion of the pressing member from the main frame member, thereby placing the pressing member in said second state in which the pressing member does not press the outside unfolded portion of the sweatband on the main frame member.

14. A headgear holder for use with a sewing machine, the headgear holder holding a headgear including a covering member which has an opening and covers the head of a person through the opening, the covering member including an annular portion located on the side of the opening, the sewing machine forming an embroidery on the annular portion of the covering member, the headgear holder comprising:

a main frame member on which the headgear is set such that the annular portion of the covering member externally fits on said main frame member;

a pressing member which externally presses the headgear set on said main frame member; and two fastening devices which fasten opposite end portions of said pressing member to said main frame member, respectively, to press the pressing member against the main frame member and thereby hold the headgear between the pressing member and the main frame member, said opposite end portions of the pressing member being unfastenable from the main frame member by said two fastening devices, respectively,

*wherein said each fastening device includes a support member, and*

*wherein a space is provided between said support member and an outer surface of the main frame member, the sweatband unfolded outside being inserted into said space and thereby externally fit on the main frame member.*

15. A headgear holder according to claim 14, wherein said main frame member has a generally cylindrical shape, and wherein each of said two fastening devices comprises a support axis member only one of opposite end portions of which is supported by said main frame member such that a space is provided between said support axis member and an outer circumferential surface of the main frame member and such that the support axis member extends toward the headgear set on the main frame member, in a direction parallel to a center line of said outer circumferential surface of the main frame member, said each fastening device further comprising a rotatable member which is supported by said support axis member such that said rotatable member is rotatable about an axis line of the support axis member relative to the main frame member.

16. A headgear holder according to claim 15, wherein said rotatable member includes a portion which moves toward said outer circumferential surface and moves away from said pressing member when said each fastening device fastens the pressing member to the main frame member.

17. A headgear holder according to claim 15, wherein said each fastening device further comprises a spring member which is supported by said rotatable member such that when said each fastening device fastens said pressing member to said main frame member, said spring member is moved with the rotatable member toward said main frame member and is elastically deformed to press the headgear on the main frame member.

18. A headgear holder according to claim 15, wherein said each fastening device further comprises:

a manually operable lever which is supported by said pressing member such that said manually operable lever is rotatable relative to the pressing member about an axis line parallel to said center line of said outer circumferential surface of said main frame member; and an engageable member which is supported by an intermediate portion of said manually operable lever such that said engageable member is rotatable about an axis line parallel to said center line of said outer circumferential surface, said engageable member being engageable with said rotatable member, said each fastening device fastening the pressing member to the main frame member, in a stable fastening state thereof in which said each fastening device is placed by the user by engaging said engageable member with said rotatable member and subsequently rotating said manually operable member relative to said pressing member over a dead center of the manually operable member.

19. A headgear holder according to claim 18, wherein said rotatable member includes:

a cylindrical portion which fits on said support axis member such that said cylindrical portion is rotatable about an axis line of the support axis member relative to said main frame member;

a bent arm including a base portion which projects, in said stable fastening state of said each fastening device, from said cylindrical portion toward said outer circumferential surface of said main frame member, said bent arm further including a bent portion which projects, in said stable fastening state, from said base portion along said outer circumferential surface toward said pressing member; and an engageable portion which comprises a free end portion of said bent arm and is engageable with said engageable member.

20. A headgear holder according to claim 19, wherein said engageable member comprises a rink having a generally rectangular shape and including four elongate portions which correspond to four sides of said rectangular shape, respectively, and cooperate with one another to define an inside hole of said rink, and wherein said engageable portion of said rotatable member comprises a hook portion which is engageable with one of said four elongate portions through said inside hole.

21. A headgear holder according to claim 20, wherein each of two elongate portions adjacent to said one elongate portion of said rink includes a bent end portion located adjacent to a corresponding one of opposite ends of said one elongate portion.

22. A headgear holder for use with a sewing machine, the headgear holder holding a headgear including a covering member which has an opening and covers the head of a person through the opening, and a sweatband which is fixed at a portion thereof to an inner surface of an annular portion of the covering member located on the side of the opening, the sweatband being foldable into an inner space of the covering member and unfoldable outside from the inner space through the opening, the sewing machine forming an embroidery on each of a frontal portion, and at least one of a right and a left temporal portion, of the annular portion, the headgear holder comprising:

a main frame member on which the headgear is set such that the sweatband unfolded outside and the annular portion of the covering member externally fit on said main frame member, the main frame member having a generally cylindrical shape and including an outer circumferential surface whose center angle is not smaller than 220 degrees;

a pressing member which externally presses the headgear set on said main frame member such that said pressing member presses the headgear against a cooperative portion of said outer circumferential surface of the main frame member, said cooperative portion having a center angle not smaller than 200 degrees, the pressing member having a shape which permits the sewing machine to form said embroidery on said each of the frontal portion, and the at least one of the right and left temporal portions, of the annular portion of the headgear; and a switching device which is operable for placing said pressing member in a first state in which the pressing member presses the headgear on said main frame member and in a second state in which the pressing member does not press the headgear on the main frame member,

*wherein said pressing member includes a support member, and*

*wherein a space is provided between said support member and an outer surface of the main frame member, the sweatband unfolded outside being inserted into said space and thereby externally fit on the main frame member.*

*23. A headgear holder supporting apparatus for supporting headgear relative to a table so that a sewing machine, independent of the headgear holder supporting apparatus, can operate on the headgear, the headgear defining an internal space and being supportable by a headgear holder that is selectively attachable to the headgear holder supporting apparatus, the headgear holder supporting apparatus comprising:*

*a base selectively attachable to the table to prevent relative movement between the base and the table;*

*a supporting member selectively attachable to the base for selectively supporting the headgear holder; and*

*a frame connectable to the supporting member for insertion into the internal space of the headgear when the headgear is supported by the headgear holder, a position of the frame relative to the supporting member being changeable.*

*24. The headgear holder supporting apparatus according to claim 23, further including a position changing device that changes the position of the frame relative to the supporting member.*

*25. The headgear supporting apparatus according to claim 24, wherein the position changing device changes the position of the frame relative to the supporting member in a direction of insertion of the frame into the internal space of the headgear.*

*26. The headgear holder supporting apparatus according to claim 23, further including a position changing device that moves the frame between a first predetermined distance from the supporting member in a first position, and a second predetermined distance from the supporting member in a second position.*

*27. The headgear holder supporting apparatus according to claim 23, wherein the frame is curved.*

*28. The headgear holder supporting apparatus according to claim 23, wherein the frame is arc shaped.*

*29. The headgear holder supporting apparatus according to claim 23, wherein the frame is shaped so as to conform to an interior surface of the headgear when the frame is inserted into the internal space of the headgear.*

*30. The headgear holder supporting apparatus according to claim 23, wherein the base includes a clamping device.*

*31. The headgear holder supporting apparatus according to claim 30, wherein the clamping device includes a manually actuated knob attached to a threaded screw.*

*32. A headgear holder supporting apparatus for supporting headgear relative to a table so that a sewing machine, independent of the headgear holder supporting apparatus, can operate on the headgear, the headgear defining an internal space and being supportable by a headgear holder that is selectively attachable to the headgear holder supporting apparatus, the headgear holder supporting apparatus comprising:*

*a base selectively attachable to the table to prevent relative movement between the base and the table;*

*a supporting member selectively attachable to the base for selectively supporting the headgear holder; and*

*a frame adjustably connectable to the supporting member such that the frame can be disposed at a first position relative to the supporting member and a second position relative to the supporting member, the first and second positions being spaced from each other, the frame being insertable into the internal space of the headgear when the headgear is supported by the headgear holder.*

*33. A headgear holder supporting apparatus for supporting headgear relative to a table so that a sewing machine, independent of the headgear holder supporting apparatus, can operate on the headgear, the headgear defining an internal space and being supportable by a headgear holder that is selectively attachable to the headgear holder supporting apparatus, the headgear holder supporting apparatus comprising:*

*a base selectively attachable to the table to prevent relative movement between the base and the table;*

*a supporting member selectively attachable to the base for selectively supporting the headgear holder; and*

*a frame connectable to the supporting member so as to be disposable at a first position wherein the frame extends a first distance into the internal space of the headgear when the headgear is supported by the headgear holder, and a second position wherein the frame extends a second distance into the internal space of the headgear when the headgear is supported by the headgear holder, the first and second distances being different.*

* * * * *